(12) United States Patent
Tokizaki et al.

(10) Patent No.: US 8,573,273 B2
(45) Date of Patent: Nov. 5, 2013

(54) PNEUMATIC TIRE

(75) Inventors: Hiroshi Tokizaki, Tokyo (JP); Takumi Morito, Tokyo (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 13/549,657

(22) Filed: Jul. 16, 2012

(65) Prior Publication Data

US 2012/0298274 A1 Nov. 29, 2012

Related U.S. Application Data

(63) Continuation of application No. 12/999,153, filed as application No. PCT/JP2009/050755 on Jan. 20, 2009, now abandoned.

(30) Foreign Application Priority Data

Jun. 17, 2008 (JP) ................................. 2008-158412

(51) Int. Cl.
*B60C 13/00* (2006.01)
*B60C 13/02* (2006.01)

(52) U.S. Cl.
USPC .......................................................... 152/523

(58) Field of Classification Search
None
See application file for complete search history.

(56) References Cited

U.S. PATENT DOCUMENTS 6,123,131 A * 9/2000 Takada .......................... 152/454

FOREIGN PATENT DOCUMENTS

| JP | 4-238703 A | | 8/1992 |
|---|---|---|---|
| JP | 9-086106 A | | 3/1997 |
| JP | 10-067208 A | | 3/1998 |
| JP | 10-086615 A | | 4/1998 |
| JP | 2000-079809 A | | 3/2000 |
| JP | 2000-118208 | * | 4/2000 |
| JP | 2000-118208 A | | 4/2000 |
| JP | 2000-255224 A | | 9/2000 |
| JP | 2002-59712 | * | 2/2002 |
| JP | 2006-213282 A | | 8/2006 |
| JP | 2008-126699 A | | 6/2008 |

OTHER PUBLICATIONS

Machine translation of JP 2002-59712, 2002.*

* cited by examiner

*Primary Examiner* — Justin Fischer
(74) *Attorney, Agent, or Firm* — Carrier Blackman & Associates, P.C.; William D. Blackman; Joseph P. Carrier

(57) ABSTRACT

A pneumatic tire has a plurality of recesses provided on the surface of each figures of a first indication portion. The recesses are provided so as to extend in the tire circumferential direction and are aligned side by side with each other in a direction crossing the extending direction. One end side and the other end side in the width direction of each recess are formed by curved surfaces of which a center of curvature is disposed at the outside in the tire width direction. Therefore, gradation of brightness occurs on the curved surface on the each recess. The gradation on the each recess changes depending on the viewing direction or the lighting direction. Therefore, each figure in the first indication portion looks three-dimensionally and can become more conspicuous than the other portions of a side wall.

26 Claims, 24 Drawing Sheets

Fig. 5

|  | Comparison example 1 | Execution example 1 | Execution example 2 | Execution example 3 | Execution example 4 | Comparison example 2 | Comparison example 3 |
|---|---|---|---|---|---|---|---|
| Width W/depth D | 1 | 2 | 5 | 10 | 20 | 30 | 40 |
| Visivility of gradation | × | ○ | ○ | ○ | ○ | △ | × |
| Visivility of ridge line | × | ○ | ○ | ○ | ○ | △ | × |

Fig. 6

|  | Comparison example 4 | Execution example 5 | Execution example 6 | Execution example 7 | Execution example 8 | Execution example 9 | Execution example 10 | Execution example 11 |
|---|---|---|---|---|---|---|---|---|
| Width W/depth D | 10 | 10 | 10 | 10 | 10 | 10 | 10 | 10 |
| Width W [mm] | 0.5 | 1 | 5 | 10 | 20 | 30 | 40 | 50 |
| Visivility of gradation | × | ○ | ○ | ○ | ○ | ○ | ○ | ○ |
| Visivility of ridge line | × | ○ | ○ | ○ | ○ | ○ | ○ | ○ |

| | Comparison example 5 | Execution example 12 | Execution example 13 | Execution example 14 | Execution example 15 | Comparison example 6 | Comparison example 7 |
|---|---|---|---|---|---|---|---|
| Width W/depth D | 1 | 2 | 5 | 10 | 20 | 30 | 40 |
| Visivility of change of brightness | × | ○ | ○ | ○ | ○ | △ | × |
| Visivility of ridge line | × | ○ | ○ | ○ | ○ | △ | × |
| Visivility of valley line | × | ○ | ○ | ○ | ○ | △ | × |

Fig. 21

|  | Comparison example 1 | Execution example 1 | Execution example 2 | Comparison example 2 | Comparison example 3 | Comparison example 4 |
|---|---|---|---|---|---|---|
| Depth D [mm] | 0.10 | 0.10 | 0.10 | 0.10 | 0.10 | 0.05 |
| Width W [mm] | 2 | 4 | 5 | 8 | 10 | 2.5 |
| W/D | 20 | 40 | 50 | 80 | 100 | 50 |
| Curvature radius R | 5.1 | 20 | 31 | 80 | 125 | 16 |
| R/D | 51 | 201 | 313 | 801 | 1251 | 313 |
| Visivility of gradation | 95 | 102 | 100 | 96 | 95 | 95 |
| Visivility of redge line | 95 | 102 | 100 | 96 | 95 | 95 |
| From 30° Seen as a difference in level | — | NO | NO | NO | NO | NO |
| From 15° Seen as a difference in level | — | NO | NO | NO | NO | NO |
| Examples of models | — | — | — | — | — | — |

Fig. 22

|  | Comparison example 5 | Execution example 3 | Execution example 4 | Execution example 5 | Comparison example 6 | Comparison example 7 |
|---|---|---|---|---|---|---|
| Depth D [mm] | 0.12 | 0.12 | 0.12 | 0.12 | 0.12 | 0.12 |
| Width W [mm] | 2 | 4 | 4.8 | 6 | 10 | 15 |
| W/D | 17 | 33 | 40 | 50 | 83 | 125 |
| Curvature radius R | 4.2 | 17 | 24 | 38 | 104 | 234 |
| R/D | 35 | 139 | 201 | 313 | 869 | 1954 |
| Visivility of gradation | 95 | 102 | 103 | 101 | 98 | 95 |
| Visivility of redge line | 95 | 103 | 103 | 101 | 98 | 95 |
| From 30° Seen as a difference in level | — | NO | NO | NO | NO | NO |
| From 15° Seen as a difference in level | — | NO | NO | NO | NO | NO |
| Examples of models | — | — | — | — | — | — |

Fig. 23

|  | Comparison example 5 | Execution example 6 | Execution example 7 | Execution example 8 | Comparison example 9 | Comparison example 10 |
|---|---|---|---|---|---|---|
| Depth D [mm] | 0.15 | 0.15 | 0.15 | 0.15 | 0.15 | 0.15 |
| Width W [mm] | 2 | 4 | 6 | 8 | 10 | 15 |
| W/D | 13 | 27 | 40 | 53 | 67 | 100 |
| Curvature radius R | 3.4 | 13 | 30 | 53 | 83 | 188 |
| R/D | 23 | 89 | 201 | 356 | 555 | 1251 |
| Visivility of gradation | 95 | 103 | 104 | 102 | 98 | 95 |
| Visivility of redge line | 95 | 104 | 104 | 102 | 98 | 95 |
| From 30° Seen as a difference in level | — | NO | NO | NO | NO | NO |
| From 15° Seen as a difference in level | — | NO | NO | NO | NO | NO |
| Examples of models | — | — | — | — | — | — |

Fig. 24

|  | Comparison example 11 | Execution example 9 | Execution example 10 | Execution example 11 | Comparison example 12 | Comparison example 13 |
|---|---|---|---|---|---|---|
| Depth D [mm] | 0.20 | 0.20 | 0.20 | 0.20 | 0.20 | 0.20 |
| Width W [mm] | 2 | 4 | 8 | 12 | 20 | 30 |
| W/D | 10 | 20 | 40 | 60 | 100 | 150 |
| Curvature radius R | 2.6 | 10 | 40 | 90 | 250 | 563 |
| R/D | 13 | 51 | 201 | 451 | 1251 | 2813 |
| Visivility of gradation | 95 | 105 | 105 | 102 | 96 | 95 |
| Visivility of redge line | 95 | 105 | 105 | 102 | 96 | 95 |
| From 30° Seen as a difference in level | — | NO | NO | NO | NO | NO |
| From 15° Seen as a difference in level | — | NO | NO | NO | NO | NO |
| Examples of models | Fig. 29 | Fig. 30 | Fig. 31 | Fig. 32 | Fig. 33 | — |

Fig. 25

|  | Comparison example 14 | Execution example 12 | Execution example 13 | Execution example 14 | Execution example 15 | Execution example 16 | Comparison example 15 | Comparison example 16 |
|---|---|---|---|---|---|---|---|---|
| Depth D [mm] | 0.5 | 0.5 | 0.5 | 0.5 | 0.5 | 0.5 | 0.5 | 0.5 |
| Width W [mm] | 2 | 5 | 8 | 12 | 20 | 30 | 40 | 50 |
| W/D | 4 | 10 | 16 | 24 | 40 | 60 | 80 | 100 |
| Curvature radius R | 1.3 | 6.5 | 16 | 36 | 100 | 225 | 400 | 625 |
| R/D | 3 | 13 | 33 | 73 | 201 | 451 | 801 | 1251 |
| Visivility of gradation | 95 | 104 | 105 | 105 | 105 | 102 | 98 | 96 |
| Visivility of ridge line | 95 | 105 | 105 | 105 | 105 | 102 | 98 | 96 |
| From 30° Seen as a difference in level | — | NO | NO | NO | NO | NO | NO | NO |
| From 15° Seen as a difference in level | — | YES | NO | NO | NO | NO | NO | NO |
| Examples of models | — | — | — | — | — | — | — | — |

Fig. 26

|  | Execution example 17 | Execution example 18 | Execution example 19 | Execution example 20 | Execution example 21 | Execution example 22 | Comparison example 17 | Execution example 23 |
|---|---|---|---|---|---|---|---|---|
| Depth D [mm] | 1.0 | 1.0 | 1.0 | 1.0 | 1.0 | 1.0 | 1.0 | 2.0 |
| Width W [mm] | 5 | 10 | 15 | 20 | 40 | 60 | 80 | 4 |
| W/D | 5 | 10 | 15 | 20 | 40 | 60 | 80 | 2 |
| Curvature radius R | 3.6 | 13 | 29 | 51 | 200 | 451 | 801 | 2.0 |
| R/D | 4 | 13 | 29 | 51 | 201 | 451 | 801 | 1 |
| Visivility of gradation | 101 | 104 | 105 | 105 | 105 | 102 | 98 | 100 |
| Visivility of ridge line | 105 | 105 | 105 | 105 | 105 | 102 | 98 | 100 |
| From 30° Seen as a difference in level | YES | NO | NO | NO | NO | NO | NO | YES |
| From 15° Seen as a difference in level | YES | YES | NO | NO | NO | NO | NO | YES |
| Examples of models | Fig.35 | Fig.36 | — | — | — | — | — | — |

Fig. 37

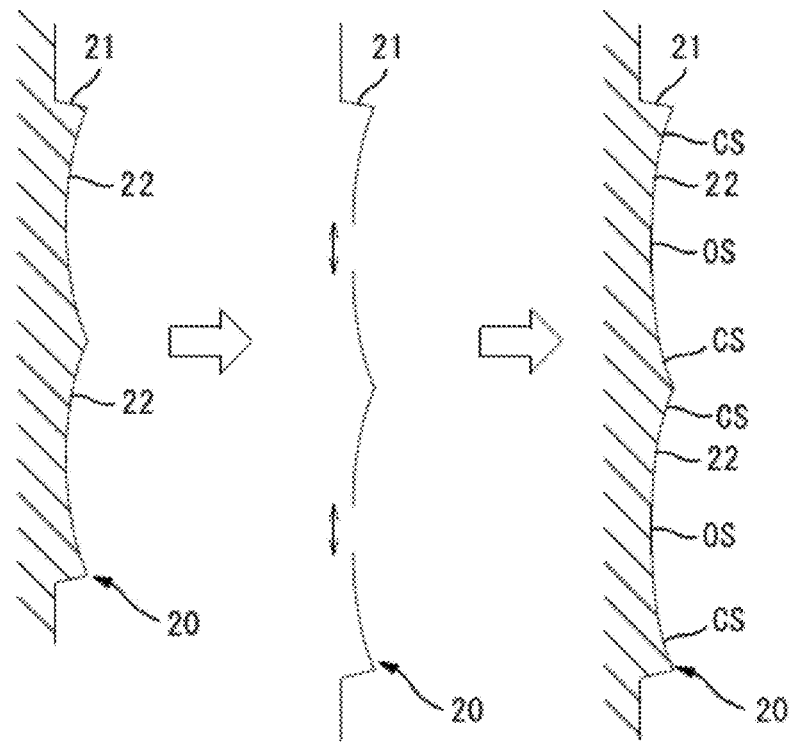

Fig. 38

| | Execution example 9 | Execution example 10 | Execution example 11 | Execution example 24 | Execution example 25 | Execution example 26 | Execution example 27 |
|---|---|---|---|---|---|---|---|
| Depth D[mm] | 0.20 | 0.20 | 0.20 | 0.20 | 0.20 | 0.20 | 0.20 |
| Width W[mm] | 4 | 8 | 12 | 7 | 11 | 15 | 8 |
| W/D | 20 | 40 | 60 | 35 | 55 | 75 | 40 |
| Curvature radius R | 10 | 40 | 90 | 10 | 40 | 90 | 30 |
| R/D | 51 | 201 | 451 | 51 | 201 | 451 | 150 |
| Visivility of gradation | 105 | 105 | 102 | 105 | 105 | 102 | 105 |
| Visivility of ridge line | 105 | 105 | 102 | 105 | 105 | 102 | 105 |
| From 30° Seen as a difference in level | NO | NO | NO | NO | NO | NO | NO |
| From 15° Seen as a difference in level | NO | NO | NO | NO | NO | NO | NO |
| Examples of models | Fig.30 | Fig.31 | Fig.32 | — | — | — | Fig.34 |

PNEUMATIC TIRE

CROSS-REFERENCE TO RELATED APPLICATIONS

This application is a continuation application of the U.S. patent application Ser. No. 12/999,153, filed on Apr. 15, 2011, which is based upon and claims the benefit of priority from the prior International Application No. PCT/JP2009/050755, filed on Jan. 20, 2009, which claims benefit of priority from the prior Japanese Application No. JP 2008-158412, filed Jun. 17, 2008. The entire contents of these prior applications are incorporated herein by reference.

BACKGROUND OF THE INVENTION

1. Technical Field

The present invention relates to a pneumatic tire provided with an indication portion showing a trademark, a tire model, a figure and the like and a projection portion such as a side protector and the like disposed on an outer surface of a side wall.

2. Background Art

In general, as a first example of this type of pneumatic tire, a tire provided with an indication portion such as a mark and the like formed by molding with a vulcanization mold on an outer surface of a side wall is known. On the surface of this indication portion, an edge section 100 is disposed as shown in FIG. 20, and a step is provided between the edge section 100 and its inner section 101.

Also, as a second example of this type of pneumatic tire, a tire provided with an indication portion such as a mark and the like formed by molding with a vulcanization mold on an outer surface of a side wall is known. On the surface of this indication portion, a plurality of grooves is disposed to be aligned side by side with each other in the width direction.

Moreover, as a third example of this type of pneumatic tire, a tire provided with a plurality of grooves referred to as ridges so as to be aligned side by side with each other in its width direction within a predetermined range in the radial direction of its side wall is known.

Patent Document 1: Japanese Patent Publication No. 10-067208

Patent Document 2: Japanese Patent Publication No. 9-086106

Patent Document 3: Japanese Patent Publication No. 2006-213282

DISCLOSURE OF THE INVENTION

Problems to be Solved by the Invention

In the pneumatic tire in the first example, the step is provided between the edge section 100 and the inner section 101 of the indication portion. Thus, a shade of the edge section 100 is formed on the inner section 101 in the vicinity of the edge section 100, and presence of the step on the surface of the indication portion can be visually recognized. However, to provide projection portions or the like continuing in the circumferential direction on the outer surface of the side wall is commonly performed and to provide another step on the outer surface of the side wall is also common. Thus, the step of the indication portion cannot be conspicuous, and it is difficult to improve the visibility of the indication portion by providing the step.

Also, in the pneumatic tire in the second example, a plurality of grooves is disposed in the indication portion. Thus, the portion other than the groove portions appears bright, while the groove portions appear dark, and the presence of the plurality of grooves on the surface of the indication portion can be visually recognized. However, as shown in the third example, to provide ridges on the outer surface of the side wall is commonly performed, and the ridges and the grooves in the indication portion are similar to each other. Thus, if the ridges are disposed on the side wall, the indication portion is not conspicuous, which is not preferable in improvement of visibility of the indication portion.

An object of the present invention is to provide a pneumatic tire that can effectively improve visibility of the indication portion disposed on the side wall.

Means for Solving the Problems

In order to achieve the above object, a pneumatic tire of the present invention is provided with an indication portion formed by molding a letter or a figure on an outer surface of a side wall, the pneumatic tire comprising a plurality of recesses provided on the surface of the latter or the figure of said indication portion, the recesses each extending in a predetermined direction and aligned side by side with each other in a direction crossing the said extending direction, wherein one end side and the other end side of each recess in its width direction are respectively formed by a curved surface of which the center of curvature is disposed at the outside in a tire width direction, a ridge line is formed at a portion where the curved surfaces of mutually adjacent two recesses are crossing, and each recess has the depth of 0.1 mm or more and the width of 4 mm or more, and the width of each recess is five times larger or more of the depth.

Also, the pneumatic tire of the present invention is provided with a projection portion formed by a vulcanization mold on an outer surface of a side wall, the pneumatic tire comprising a plurality of recesses provided on the surface of the projection portion, the recesses each extending in a predetermined direction and aligned side by side with each other in a direction crossing the said extending direction, wherein one end side and the other end side of each recess in its width direction are respectively formed by a curved surface of which the center of curvature is disposed at the outside in a tire width direction, a ridge line is formed at a portion where the curved surfaces of mutually adjacent two recesses are crossing, and each recess has the depth of 0.1 mm or more and the width of 4 mm or more, and the width of each recess is five times larger or more of the depth.

As mentioned above, the plurality of recesses is provided on the surface of the letter or figure of the indication portion or the surface of the projection portion, and the respective recesses are so provided as to extend in the predetermined direction and arranged side by side with each other in the direction crossing the extending direction. Also, one end side and the other end side of each recess in the width direction are respectively formed by a curved surface of which the center of curvature is disposes at the outside in the tire width direction. Thus, gradation of brightness occurs on the curved surface portion of the recess, the gradation occurs on each recess and the gradation changes depending on the viewing direction or the light direction.

Also, since the side wall is a part of a tire formed in a toroidal shape, the respective recesses become arranged so that the facing directions thereof are slightly different from each other. Thus, the change of gradation in each recess appears different from each other.

Also, a ridge line is formed at a portion where the curved surfaces of mutually adjacent two recesses are crossing. Thus, brightness of the surface of the letter or figure constituting the indication portion or the brightness of the surface of the projection portion is changed across the ridge line.

Also, the pneumatic tire of the present invention is provided with the indication portion formed by molding a letter or a figure on an outer surface of a side wall, the pneumatic tire comprising a plurality of recesses provided on the surface of the latter or the figure of said indication portion, the recesses each extending in a predetermined direction and aligned side by side with each other in a direction crossing the said extending direction, wherein each recess is formed by a curved surface of which the center of curvature is disposed at the outside in a tire width direction, a ridge line is formed at a portion where the curved surfaces of mutually adjacent two recesses are crossing, and each recess has the depth of 0.1 mm or more and the width of 4 mm or more, and the width of each recess is five times larger or more of the depth.

Also, the pneumatic tire of the present invention is provided with the projection portion formed by a vulcanization mold on an outer surface of a side wall, the pneumatic tire comprising a plurality of recesses provided on the surface of said projection portion, the recesses each extending in a predetermined direction and aligned side by side with each other in a direction crossing the said extending direction, wherein each recess is formed by a curved surface of which the center of curvature is disposed at the outside in a tire width direction, a ridge line is formed at a portion where the curved surfaces of mutually adjacent two recesses are crossing, and each recess has the depth of 0.1 mm or more and the width of 4 mm or more, and the width of each recess is five times larger or more of the depth.

As mentioned above, the plurality of recesses is provided on the surface of the character or figure of the indication portion or the surface of the projection portion, and the respective recesses are so provided as to extend in the predetermined direction and arranged side by side with each other in a direction crossing the extending direction. Also, each recess is formed by a curved surface of which the center of curvature is disposes at the outside in the tire width direction. Thus, gradation of brightness occurs on the curved surface portion of the recess, the gradation occurs on each recess and the gradation of each recess changes depending on the viewing direction or the light direction.

Also, since the side wall is a part of a tire formed in a toroidal shape, the respective recesses become arranged so that the facing directions thereof are slightly different from each other. Thus, the change of gradation in each recess appears different from each other.

Also, the ridge line is formed at a portion where the curved surfaces of mutually adjacent two recesses are crossing. Thus, brightness of the surface of the letter or figure constituting the indication portion or the brightness of the surface of the projection portion is changed across the ridge line.

Advantages of the Invention

According to the present invention, since the gradation of brightness of each recess changes depending on the viewing direction or the light direction, the surface of the indication portion or the projection portion looks three-dimensionally, and the indication portion or the projection portion can become more distinct than the other portions of the side wall. That is, it is extremely advantageous in effective improvement of the visibility of the indication portion or the projection portion disposed on the side wall.

Also, the gradation of brightness of each recess changes depending on the viewing direction or the light direction, the change of gradation in each recess appears different from each other, and the brightness of the surface of the character or figure constituting the indication portion or the brightness of the surface of the projection portion is changed across the ridge line. Thus, the surface of the letter or figure constituting the indication portion or the surface of the projection portion gives unique impression to viewers. That is, it is extremely advantageous in improvement of the visibility of the indication portion or the projection portion disposed on the side wall.

The above object as well as the other objects, characteristics and advantages of the present invention will become apparent from the following description and the attached drawings.

BRIEF DESCRIPTION OF THE DRAWINGS

FIG. 5 is a table showing experimental results;

FIG. 6 is a table showing experimental results;

FIG. 21 is a table showing experimental results;

FIG. 22 is a table showing experimental results;

FIG. 23 is a table showing experimental results;

FIG. 24 is a table showing experimental results;
FIG. 25 is a table showing experimental results;
FIG. 26 is a table showing experimental results;
FIG. 37 is a diagram showing a comparison between a recess formed by a single circular arc and a recess in which one end side and the other end side in the width direction are formed by curved surfaces;
FIG. 38 is a table showing experimental results.

DESCRIPTION OF SYMBOLS

10 . . . Side wall, 20 . . . First indication portion, 21 . . . Figure, 22 . . . Recess, 23 . . . Projection portion, 24 . . . Recess, 24a . . . First slanting surface, 24b . . . Second slanting surface, 30 . . . Second indication portion, C1, C2 . . . Center of curvature, CS . . . Curved surface, OS . . . Another surface, W . . . Width, D . . . Depth, RL . . . Ridge line, VL . . . Valley line.

ILLUSTRATIVE MODE FOR CARRYING OUT THE INVENTION

Figure 1:
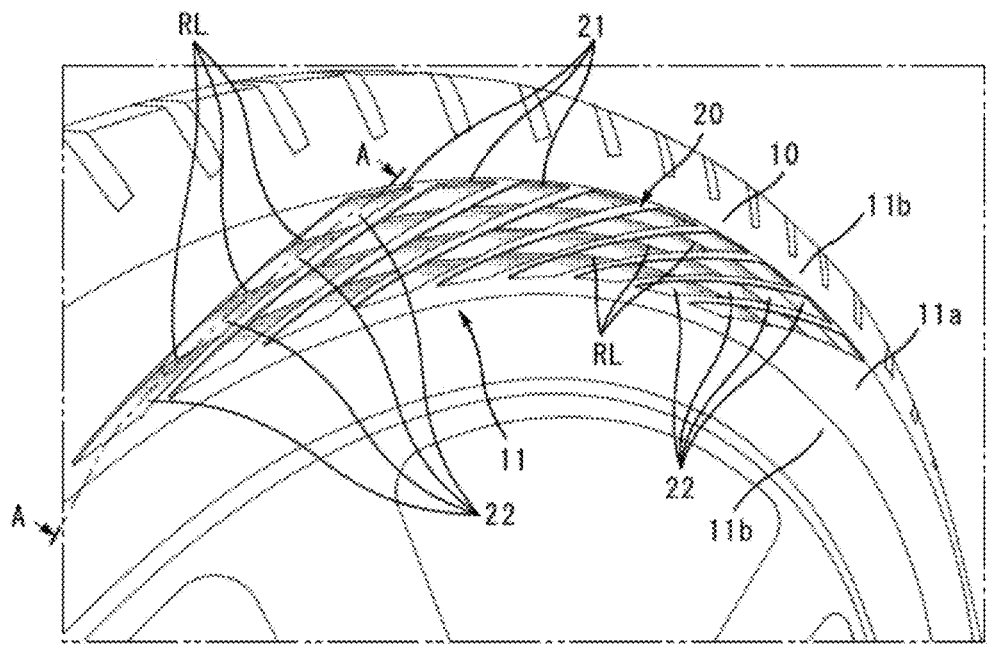
FIG. 1 is a perspective view of an essential portion of a pneumatic tire showing a first embodiment of the present invention.
Figure 2:
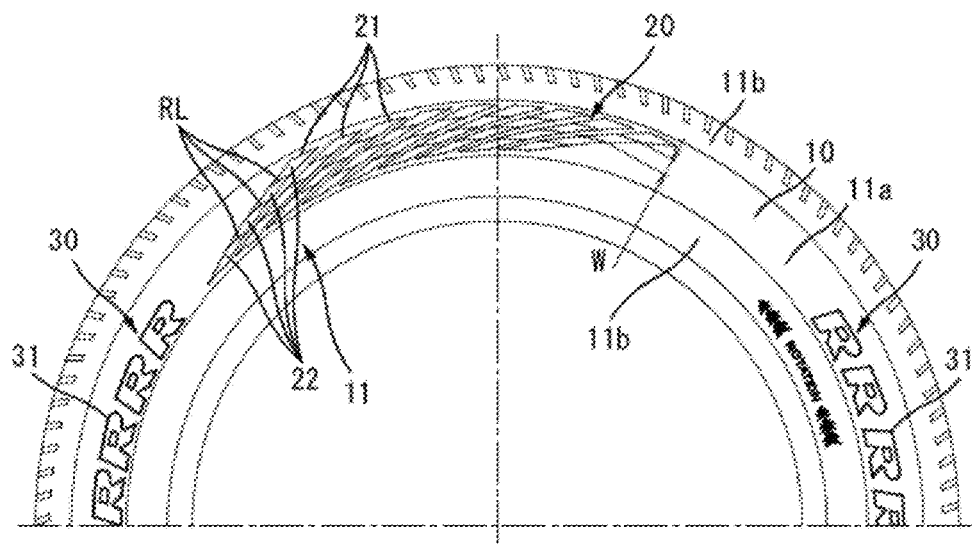
FIG. 2 is a side view of the pneumatic tire.
Figure 3:
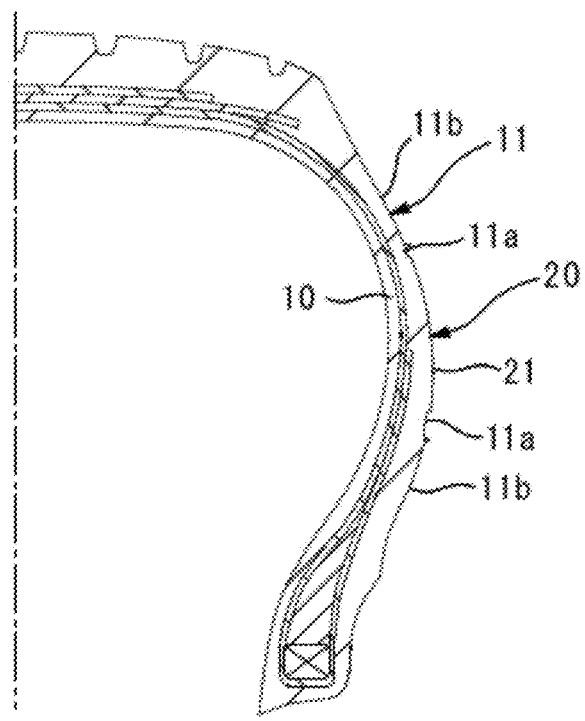
FIG. 3 is a sectional view of the pneumatic tire.
Figure 4:
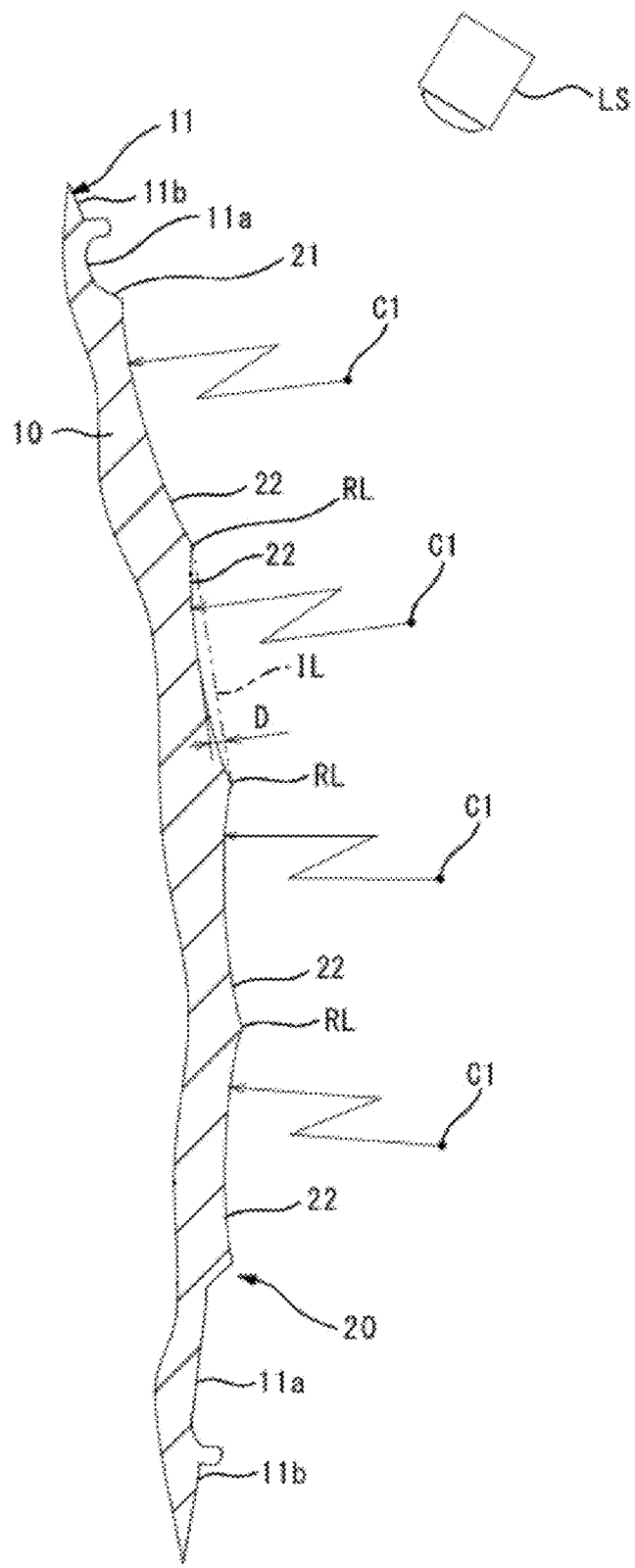
FIG. 4 is a sectional view taken along A-A line in FIG. 1.

FIGS. 1 to 5 show a first embodiment of the present invention. FIG. 1 is a perspective view of an essential portion of a pneumatic tire, FIG. 2 is a side view of the pneumatic tire, FIG. 3 is a sectional view of the pneumatic tire, FIG. 4 is a sectional view taken along A-A line of FIG. 1, and FIG. 5 is a table showing experimental results.

As shown in FIGS. 1 to 4, this pneumatic tire is provided on an outer surface 11 of its side wall 10 a first indication portion 20 formed by a plurality of FIG. 21, and a second indication portion 30 which is formed by a plurality of letters 31 and is showing a mark or the like. Recesses corresponding to the indication portions 20 and 30 are provided in a vulcanization mold, and the indication portions 20 and 30 are formed by molding on the side wall 10 by the recesses. In the present embodiment, the indication portions 20 and 30 are formed so as to project relative to the outer surface 11 of the side wall.

The indication portions 20 and 30 can alternatively be formed so as to be recessed relative to the outer surface 11 of the side wall. A region 11a in the outer surface 11 on the side wall 10 where the indication portions 20 and 30 are provided is formed by being slightly recessed relative to other regions 11b. Also, each of the indication portions 20 and 30 is provided on or in the vicinity of a position at which the tire width is maximized.

The first indication portion 20 is formed of a plurality of parallelogrammic FIG. 21. The FIG. 21 are arranged at intervals with each other in a tire circumferential direction. Also, a plurality of recesses 22 is provided on the surface of each FIG. 21 facing outward in the tire width direction. The recesses 22 are provided so as to extend in the tire circumferential direction and are aligned side by side with each other in a direction crossing the extending direction (in a direction perpendicular to the extending direction in the present embodiment). Each recess 22 is formed by a curved surface of which a center of curvature C1 is disposed at the outside in the tire width direction relative to the curved surface.

In the pneumatic tire thus formed, the plurality of recesses 22 are provided on the surface of each FIG. 21 of the first indication portion 20. Also, the recesses 22 are provided so as to extend in the tire circumferential direction and are aligned side by side with each other in a direction crossing the extending direction. Each recess 22 is formed by the curved surface of which the center of curvature C1 is disposed at the outside in the tire width direction. Therefore, gradation of brightness occurs on the curved surface of each recess 22. That is, as shown in FIG. 1 and FIG. 4, for example, when light is applied from a light source LS from the above and when the side wall 10 is seen from the outside in the tire width direction, gradation occurs on the each recess 22 such that the brightness increases gradually from the upper side toward the lower side. Also, the gradation on the each recess 22 changes depending on the viewing direction or the lighting direction. Further, the side wall 10 is a part of the tire formed in a toroidal shape and the directions in which the recesses 22 face differ slightly from each other. Accordingly, the changes of gradation on the recesses 22 also differ from each other. Further, a ridge line RL is formed at a portion where the curved surfaces of mutually adjacent two recesses 22 are crossing. Accordingly, the brightness of the surface of the FIG. 21 changes across the ridge line RL, so that the ridge line RL is visually recognizable.

Thus, in the present embodiment, the gradation of brightness on the each recess 22 changes depending on the viewing direction or the lighting direction. Therefore, each FIG. 21 in the first indication portion 20 looks three-dimensionally and can become more distinct than the other portions of the side wall 10. That is, it is extremely advantageous in effectively improving the visibility of the first indication portion 20 provided on the side wall 10.

Figure 7:
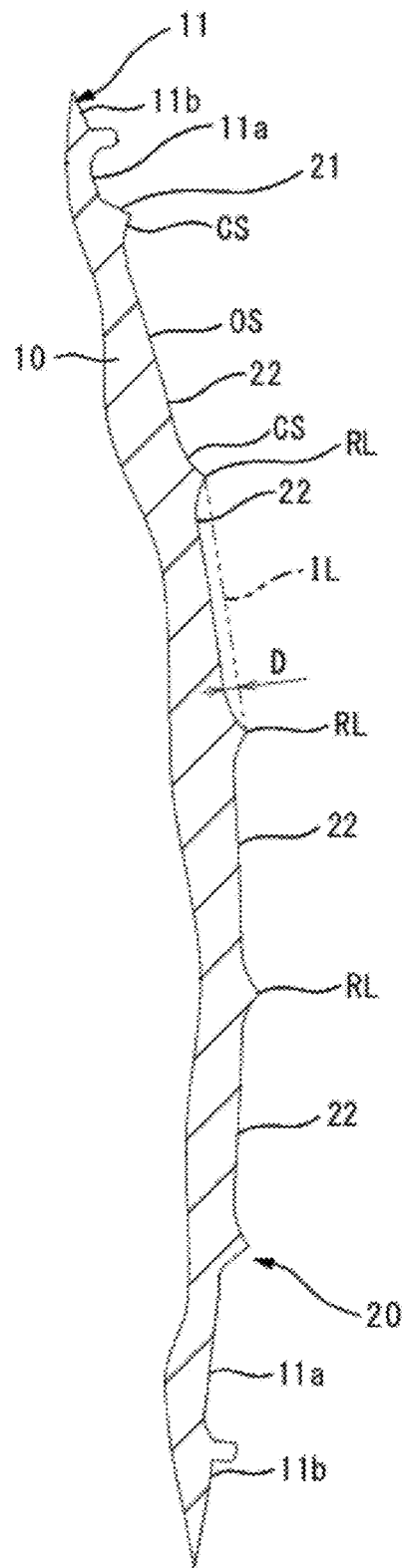
FIG. 7 is a sectional view of an essential portion of a pneumatic tire showing a first modification of the first embodiment.

Further, the ridge line RL is formed at the portion where the curved surfaces of two mutually adjacent recesses 22 are crossing, and the ridge line RL is visually recognizable. It will be noted that in many of the disclosed embodiments of the invention, the ridge line RL forms a peak as viewed in cross section, as shown in FIGS. 4 and 7. Therefore, by means of a combination of the gradation on the recess 22 and a plurality of the ridge lines RL, each FIG. 21 in the first indication portion 20 gives a unique visual impression to viewers.

Also, the first indication portion 20 is formed by the plurality of FIG. 21 arranged at intervals with each other in the tire circumferential direction and each formed in a parallelogrammic shape. Therefore, by means of a combination of the gradation on the recess 22 and a plurality of the ridge lines RL, the first indication portion 20 gives a unique impression to viewers.

Also, each recess 22 is provided so as to extend in the tire circumferential direction. Therefore, it is advantageous in reducing an air drag of the tire. Forming the vulcanization mold is also facilitated.

Also, grooves are formed on portions of the vulcanization mold corresponding to the ridge lines RL. Therefore, air or generated gas at the time of vulcanization molding can be released through the grooves, and it is advantageous in improving the rubber flow in the portions for the FIG. 21 at the time of vulcanization molding.

Also, the appearances of the gradation on the each recess 22 and the each ridge line RL change with a change in the relationship between the width W (width size) and the depth D (depth size) of the recess 22. In this specification, the width direction of the recess 22 is perpendicular to the extending direction of the recess 22, and on the width W (width size) of the recess 22 is the size of the recess 22 in the width direction. FIG. 5 shows the results of an experiment on the visibility of the gradation on the each recess 22 and on the visibility of each ridge line RL by setting the proportion of the width W to the depth D to be a plurality of values. In this experiment, the width W was set to be 4 mm and the proportion of the width W to the depth D was set to be the plurality of values. According to this experiment, the visibilities of the ridge line RL and the gradation degrade when the width W becomes larger than a value twenty times larger than the depth D. The visibilities of the ridge line RL and the gradation degrade when the width W becomes smaller than a value two times larger than the depth D. That is, by this experiment, the results showing it is preferable that the width W be two times or more larger than the depth D and twenty times or less larger than the depth D were obtained.

Also, the appearances of the gradation on the each recess 22 and each ridge line RL change with a change in magnitude of the width W of the recess 22. FIG. 6 shows the results of an experiment on the visibility of the gradation on the each recess 22 and on the visibility of each ridge line RL by setting the width W to be the value ten times larger than the depth D and by setting the width to be a plurality of values. According to this experiment, the visibilities of the gradation and the ridge line RL degrade when the width W is smaller than 1 mm. That is, it is preferable that the width W be 1 mm or more.

In the present embodiment, the recesses 22 are formed by curved surfaces of which the single center of curvature C1 is disposed at the outside in the tire width direction. However, it is possible to gradually change the curvature of the curved surfaces of each recess 22. In such case, the center of the curvature at the outside in the tire width direction is made plural or in the form of a line. Also, even in the case of gradually changing the curvature of the curved surface of the recess 22, the same functions and effects as those in the case where the single center of curvature C1 is provided can be achieved.

In the present embodiment, the whole of each recess 22 is formed by the curved surface of which the center of curvature C1 is disposed at the outside in the tire width direction. However, as shown in FIG. 7, each recess 22 can be such that one end side and the other end side in the width direction are formed by curved surfaces CS and another surface OS is formed by a flat surface or a curved surface of which a center of curvature is disposed at the inside in the tire width direction. A center of curvature of each curved surface CS is disposed at the outside in the tire width direction relative to the curved surface CS. Also in this case, gradation of brightness occurs on each curved surface CS and ridge lines RL are formed between the recesses 22. Therefore the same functions and effects as those described above can also be achieved. The other surface OS can be formed so as to extend parallel to the outer surface of the side wall 10.

Also in this case, the radius of curvature of the curved surface CS changes with changes in the width W and the depth D of the recess 22. That is, the appearances of the gradation on the each recess 22 and each ridge line RL change. The relationship between the proportion of the width W to the depth D and the visibilities of the gradation and each ridge line RL, and the relationship between the magnitude of the depth W of the recess 22 and the visibilities of the gradation and each ridge line RL are the same as the results shown in FIGS. 5 and 6.

Figure 8:
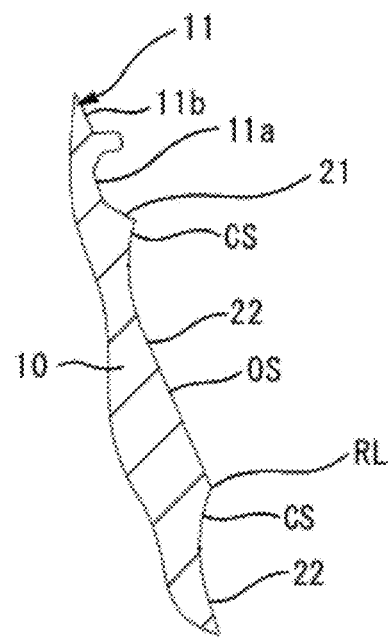
FIG. 8 is a sectional view of an essential portion of a pneumatic tire showing a second modification of the first embodiment.
Figure 9:
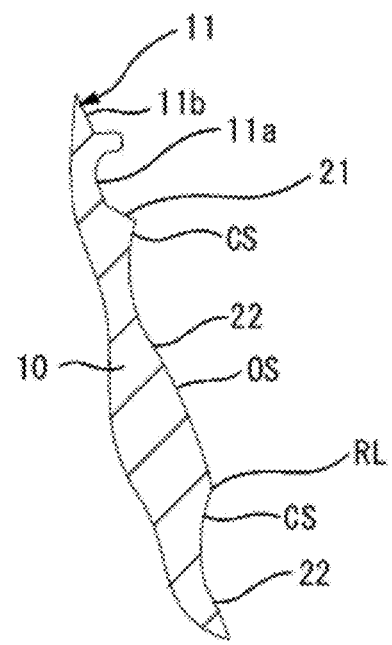
FIG. 9 is a sectional view of an essential portion of a pneumatic tire showing a third modification of the first embodiment.

Also, as shown in FIGS. 8 and 9, each recess 22 can be such that one end side in the width direction is formed by a curved surface CS of which a center of curvature is disposed at the outside in the tire width direction, and another surface CS is formed by a flat surface or a curved surface of which a center of curvature is disposed at the inside in the tire width direction. Also in this case, gradation of brightness occurs on each curved surface CS and ridge lines RL are formed between the recesses 22. Therefore the same functions and effects as those described above can also be achieved.

In the present embodiment, four recesses 22 are provided in each FIG. 21. However, the same functions and effects as those described above can also be achieved if two or more recesses 22 are provided in the FIG. 21. If three or more recesses 22 are provided in the FIG. 21, the above-described effects become conspicuous. Therefore, it is preferable that three or more recesses 22 be provided on the FIG. 21.

Figure 10:
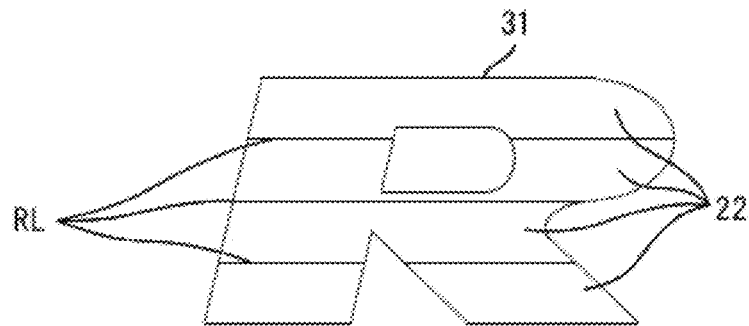
FIG. 10 is a sectional view of an essential portion of a pneumatic tire showing a fourth modification of the first embodiment.
Figure 11:
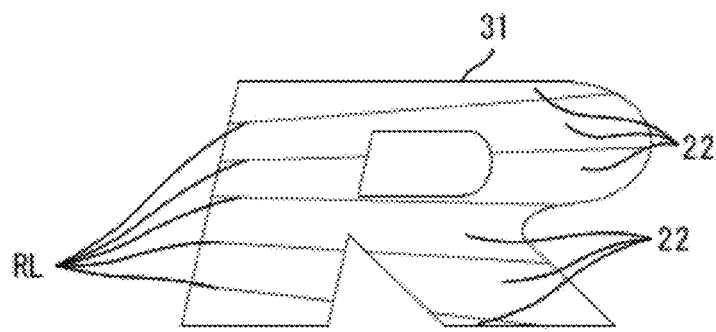
FIG. 11 is a sectional view of an essential portion of a pneumatic tire showing a fifth modification of the first embodiment.
Figure 12:
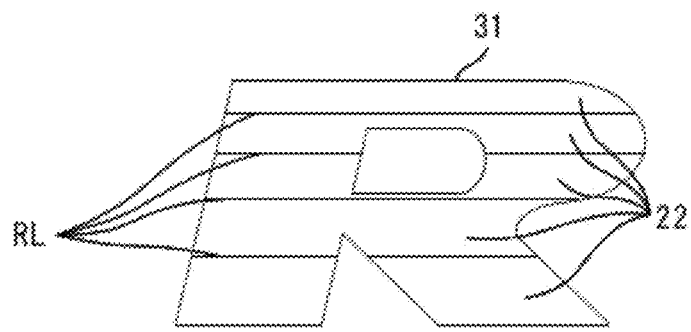
FIG. 12 is a sectional view of an essential portion of a pneumatic tire showing a sixth modification of the first embodiment.

In the present embodiment, a plurality of recesses 22 are provided on the surface of each FIG. 21 in the first indication portion 20. However, as shown in FIG. 10, a plurality of recesses 22 can be provided on the surface of each letter 31 in the second indication portion 30. Further, in the present embodiment, the width W of each recess 22 is constant. However, as shown in FIG. 11, each recess 22 can be formed so that the width W is gradually increased along the extending direction. Also in this case, the recesses are aligned side by side with each other in a direction crossing the extending direction. Therefore the same functions and effects as those described above can also be achieved. Further, as shown in FIG. 12, the recesses 22 can be formed so that the widths W thereof become different from each other. Also in this case, the same functions and effects as those described above can be achieved. Modifications shown in FIGS. 10 to 12 are also applicable to second and third embodiments described below.

Figure 13:
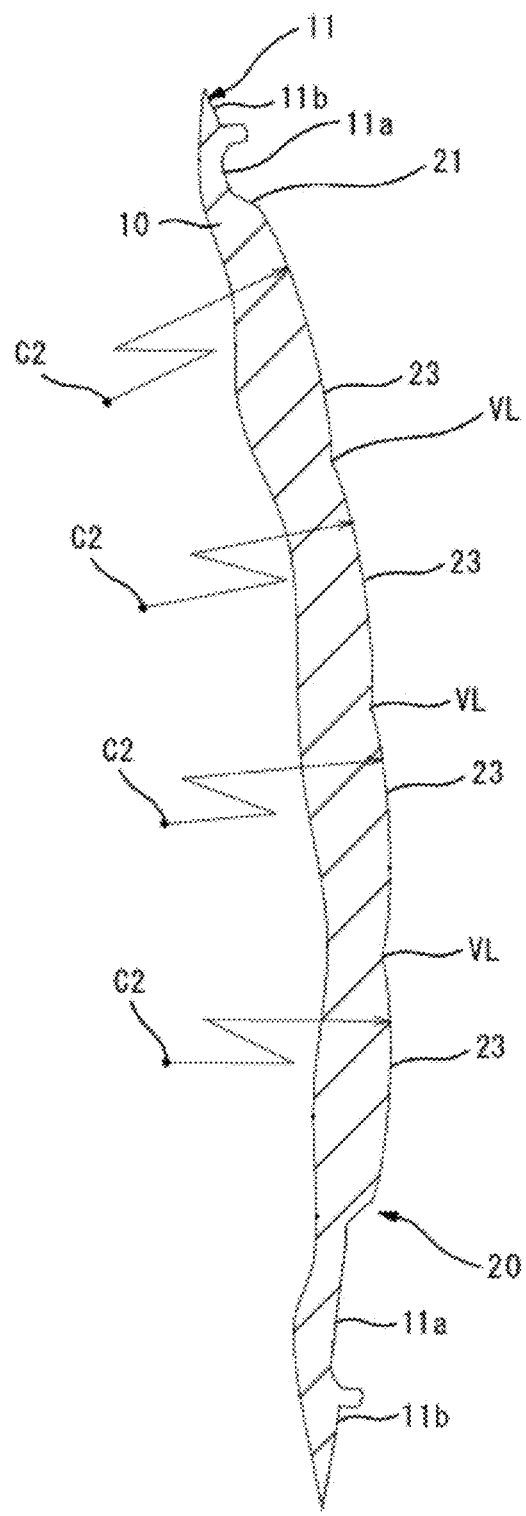
FIG. 13 is a sectional view of an essential portion of a pneumatic tire showing a second embodiment of the present invention.

FIG. 13 is a sectional view of an essential portion of a pneumatic tire showing a second embodiment of the present invention. Also, the compositions which are the same to the ones in the previously explained first embodiment are assigned the same symbols.

In the second embodiment, a plurality of projection portions 23 are provided in place of the plurality of recesses 22 on each FIG. 21 of the first indication portion 20.

In this case, the projection portions 23 are provided so as to extend in the tire circumferential direction and are aligned side by side with each other in a direction crossing the extending direction (in a direction perpendicular to the extending direction in the present embodiment). Each projection 23 is formed by a curved surface of which a center of curvature C2 is disposed at the inside of the curved surface in the tire width direction.

In the pneumatic tire thus formed, the plurality of projection portions 23 are provided on the surface of each FIG. 21 of the first indication portion 20. Also, the projection portions 23 are provided so as to extend in the tire circumferential direction and are aligned side by side with each other in the direction crossing the extending direction. The each projection portion 23 is formed by the curved surface of which the center of curvature C2 is disposed at the inside in the tire width direction. Therefore, gradation of brightness occurs on the curved surface of the each projection portion 23. The gradation on the each projection portion 23 changes depending on the viewing direction or the lighting direction. Further, the side wall 10 is a part of the tire formed in a toroidal shape and the directions in which the projection portions 23 face are slightly different from each other. Accordingly, the changes of gradation in the projection portions 23 also differ from each other. Further, a valley line VL is formed at a portion where the curved surfaces of mutually adjacent two projections 23 are crossing, and the brightness of the surface of the FIG. 21 changes across the valley line VL. Therefore the valley line VL is visually recognizable.

Thus, in the present embodiment, the gradation on the each projection 23 changes depending on the viewing direction or the lighting direction. Therefore, each FIG. 21 of the first indication portion 20 looks three-dimensionally and can become more distinct than the other portions of the side wall 10. That is, it is extremely advantageous in effectively improving the visibility of the first indication portion 20 provided on the side wall 10.

Further, the valley line VL is formed at the portion where the curved surfaces of the projections 23 are crossing, and the valley line VL is visually recognizable. Therefore, by means of a combination of the gradation on the projection 23 and a plurality of the valley lines VL the first indication portion 20 gives a unique impression to viewers.

Also, each projection 23 is provided so as to extend in the tire circumferential direction. Therefore, it is advantageous in reducing the air drag of the tire. Forming the vulcanization mold is also facilitated.

Figure 14:
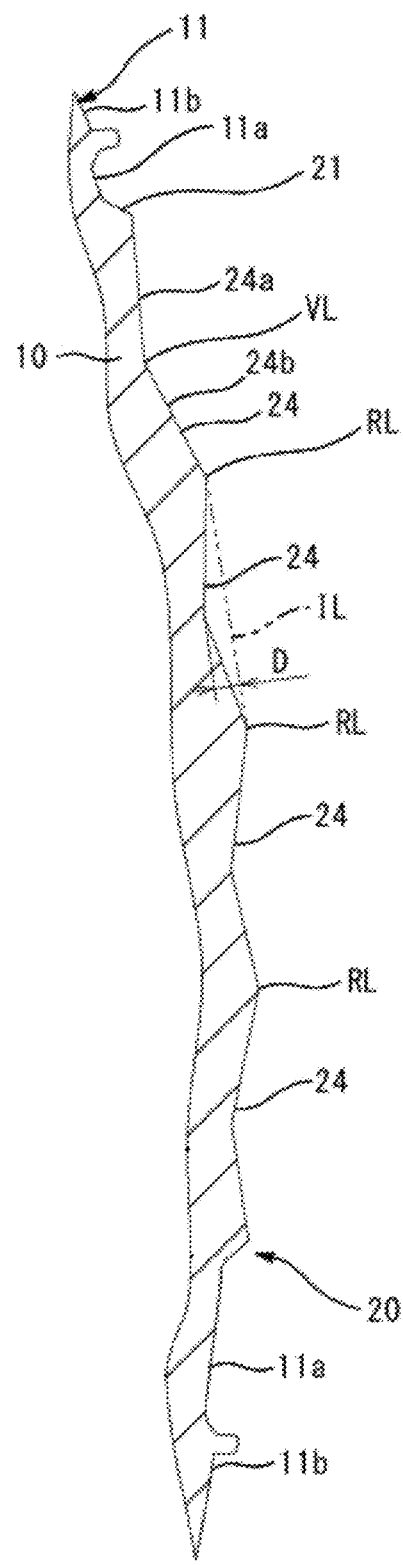
FIG. 14 is a sectional view of an essential portion of a pneumatic tire showing a third embodiment of the present invention.
Figures 15, 16:
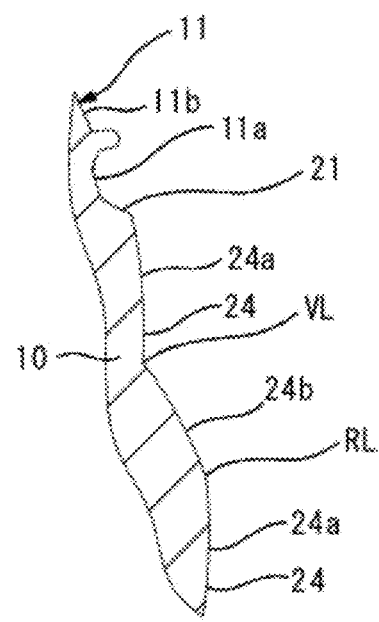
FIG. 15 is a table showing experimental results.
FIG. 16 is a sectional view of an essential portion of a pneumatic tire showing a modification of the third embodiment.

FIGS. 14 and 15 show a third embodiment of the present invention. FIG. 14 is a sectional view of an essential portion of a pneumatic tire. FIG. 15 is a table showing experimental results. Also, the compositions which are the same to the ones in the previously explained first embodiment are assigned the same symbols.

In the third embodiment, a plurality of recesses 24 are provided in place of the plurality of recesses 22 on the each FIG. 21 of the first indication portion 20.

In this case, the recesses 24 are provided so as to extend in the tire circumferential direction and are aligned side by side with each other in a direction crossing the extending direction (in a direction perpendicular to the extending direction in the present embodiment). The each recess 24 is formed by a first slanting surface 24a slanting from one end of the recess 24 in the width direction toward a center in the width direction inwardly of the tire, and a second slanting surface 24b slanting from the other end of the recess 24 in the width direction toward the center in the width direction inwardly of the tire. The each of the slanting surfaces 24a and 24b is formed into a planar shape. The width W of each recess 24 is approximately five times larger than the depth D.

In the pneumatic tire thus formed, the plurality of recesses 24 are provided on the surface of each FIG. 21 of the first indication portion 20. Also, the recesses 24 are provided so as to extend in the tire circumferential direction and are aligned side by side with each other in a direction crossing the extending direction. The each recess 24 is constituted by the first slanting surface 24a and the second slanting surface 24b, and the width W of each recess 24 is five times larger than the depth D. Therefore the brightnesses on the first slanting surface 24a and the second slanting surface 24b change depending on the viewing direction or the lighting direction, and the changes of brightnesses on the first slanting surface 24a and the second slanting surface 24b are different from each other. Further, a ridge line RL is formed between mutually adjacent two recesses 24, and a valley line VL is formed at a portion where the slanting surfaces 24a and 24b are crossing. Also, the brightness on the surface of the FIG. 21 changes across the ridge line RL and across the valley line VL. Therefore the existence of the ridge line RL and the valley line VL is visually recognizable.

Thus, in the present embodiment, the brightnesses on the first slanting surface 24a and the second slanting surface 24b change depending on the viewing direction or the lighting direction. Therefore, each FIG. 21 in the first indication portion 20 looks three-dimensionally and can become more distinct than the other portions of the side wall 10. That is, it is extremely advantageous in effectively improving the visibility of the first indication portion 20 provided on the side wall 10.

Further, the ridge line RL is formed between the mutually adjacent two recesses 24, the valley line VL is formed at the portion where the slanting surfaces 24a and 24b are crossing, and the ridge line RL and the valley line VL are visually recognizable. Therefore, by means of a combination of the changes of the brightnesses on the slanting surfaces 24a and 24b and pluralities of the ridge lines RL and valley lines VL, the first indication portion 20 gives a unique impression to viewers.

Also, the appearances of the gradation on each recess 24, each line RL and each line VL change with a change in the relationship between the width W and the depth D of the recess 24. FIG. 15 shows results of an experiment on the visibility of the changes of the brightnesses on the slanting surfaces 24a and 24b in each recess 24 and the visibilities of each line RL and each line VL made by setting the proportion of the width W to the depth D to a plurality of values. In this experiment, the width W was set to 4 mm and the proportion of the width W to the depth D was set to the plurality of values. According to this experiment, the visibility of each ridge line RL, the visibility of each valley line VL, and the visibilities of the changes of the brightnesses on the slanting surfaces 24a and 24b degrade when the width W is larger than the value twenty times or more larger than the depth D. Also, the visibility of each ridge line RL, the visibility of each valley line VL, and the visibilities of the changes of the brightnesses on the slanting surfaces 24a and 24b degrade when the width W is smaller than the value two times larger than the depth D. That is, it is preferable that the width W be two times or more larger than the depth D and twenty times or less larger than the depth D.

In the present embodiment, each of the slanting surfaces 24a and 24b is formed into a planar shape. However, as shown in FIG. 16, each of the slanting surfaces 24a and 24b can alternatively be formed of a curved surface of which a center of curvature is disposed at the inside in the tire width direction. Also in this case, the same functions and effects as those described above can be achieved.

Figure 17:
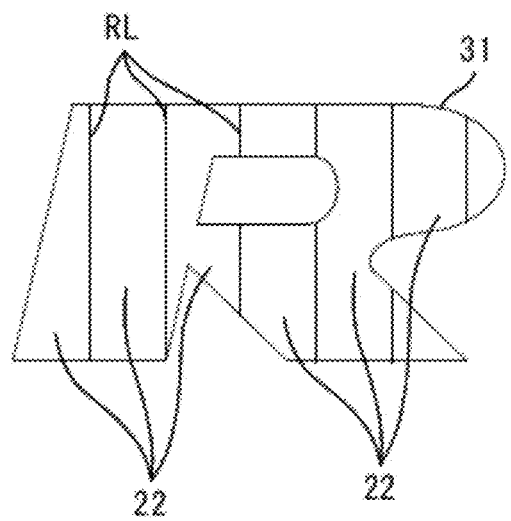
FIG. 17 is a sectional view of an essential portion of a pneumatic tire showing a seventh modification of the first embodiment.
Figure 18:
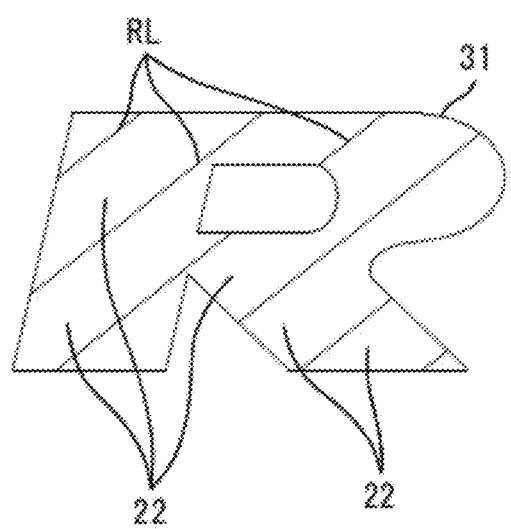
FIG. 18 is a sectional view of an essential portion of a pneumatic tire showing an eighth modification of the first embodiment.

In the first to third embodiments, each recess 22, each projection portion 23 and each recess 24 are formed so as to extend in the tire circumferential direction. However, as shown in FIG. 17 for example, each recess 22 can be formed on the each letter 31 of the second indication portion 30 so as to extend in the tire radial direction. Also, as shown in FIG. 18, each recess 22 can be formed so as to extend in a direction oblique to the tire circumferential direction. Also in these cases, the same functions and effects as those described above can be achieved.

Figure 19:
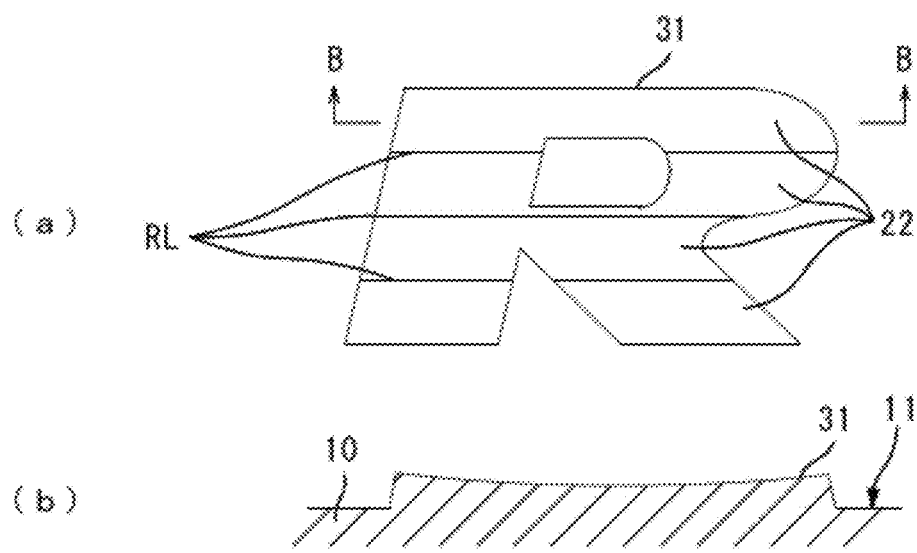
FIG. 19 is a sectional view of an essential portion of a pneumatic tire showing a ninth modification of the first embodiment.
Figure 20:
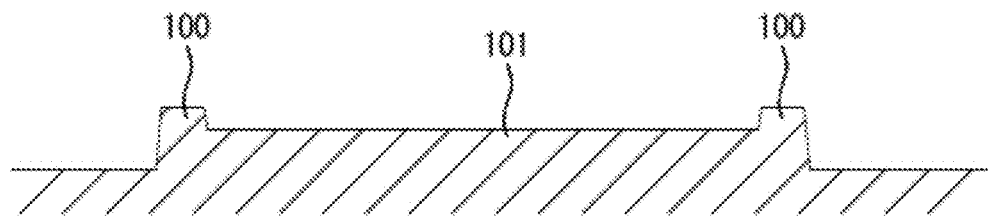
FIG. 20 is a first example of a conventional indication portion.

Further, in the first and third embodiments, the proportion of the width W to the depth D of each recess 22 and each recess 24 can be made constant along the extending direction or gradually increased or reduced along the extending direction. Further, as shown in FIG. 19, for example, in a case where recesses 22 are provided on a letter in the second indication portion 30, each recess 22 can be formed so that a contour in section of the recess 22 in the extending direction is a curve of which a center of curvature is disposed at the outside in the tire width direction. In this case, gradation of brightness also occurs in the extending direction of the recess 22, so that the above-described effects become conspicuous. FIG. 19(b) is a sectional view taken along B-B line of FIG. 19(a).

In the first embodiment, as shown in FIGS. 1 and 2, the plurality of recesses 22 are provided on the surface of each FIG. 21 and are formed so as to extend in the tire circumferential direction. Also, the FIG. 21 are provided so as to be aligned side by side in the tire circumferential direction. Further, groups of four recesses 22 (the same numbers of recesses 22) are respectively provided on the FIG. 21. Therefore the gradation on the recesses 22 and the ridge lines RL appearing on each FIG. 21 look to accord with each other and each FIG. 21 in the first indication portion 20 gives a unique impression to viewers. That is, it is extremely advantageous in effectively improving the visibility of the first indication portion 20 provided on the side wall 10. This configuration can also be applied to the second and third embodiments to achieve the same functions and effects.

Further, in the first embodiment, as shown in FIGS. 1 and 2, the recesses 22 provided in mutually adjacent FIG. 21 are aligned side by side in the tire circumferential direction. Therefore the gradation on the recesses 22 and the ridge lines RL appearing on each FIG. 21 look to accord with each other and each FIG. 21 in the first indication portion 20 gives a unique impression to viewers. That is, it is extremely advantageous in effectively improving the visibility of the first indication portion 20 provided on the side wall 10. This configuration can also be applied to the second and third embodiments to achieve the same functions and effects.

In the first embodiment, as shown in FIGS. 1 and 2, nine figures are provided in the first indication portion 20 so as to be aligned side by side in the tire circumferential direction. However, in a case where two figures are provided on the first indication portion 20 so as to be aligned side by side in the tire circumferential direction, the effect based on aligning the recesses 22 side by side in the tire circumferential direction can be achieved. Preferably, three or more figures should be aligned side by side in the tire circumferential direction on the first indication portion 20. In this case, the effect based on aligning the recesses 22 side by side in the tire circumferential direction becomes conspicuous.

In the first embodiment, the visibilities of each ridge line RL and the gradation were evaluated by setting the width W to be 4 mm and setting the ratio of the width W to the depth D to be a plurality of values (see FIG. 5). After the first application, the applicant conducted studies on the present invention to obtain further results. The newly obtained results will be described below. For example, the first indication portion 20 and the second indication portion 30 in the present embodiment are provided on a tire of a size of 225-65R17. The first indication portion 20 and the second indication portion 30 in the present embodiment can also be provided on tires of other sizes.

Figure 27:
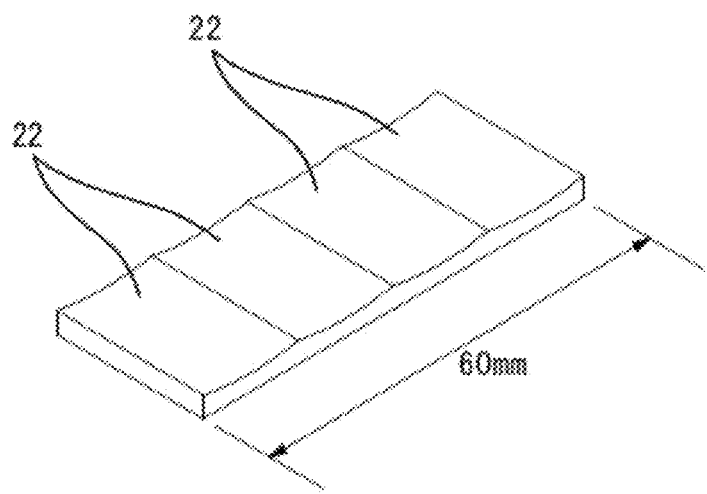
FIG. 27 is a perspective view of a model.
Figure 28:
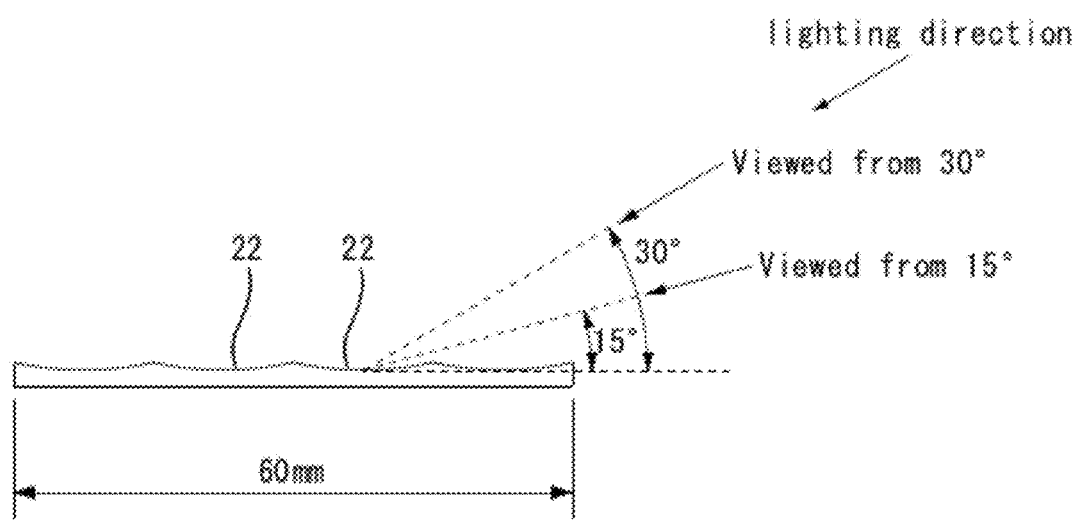
FIG. 28 is a side view of the model.
Figure 29:
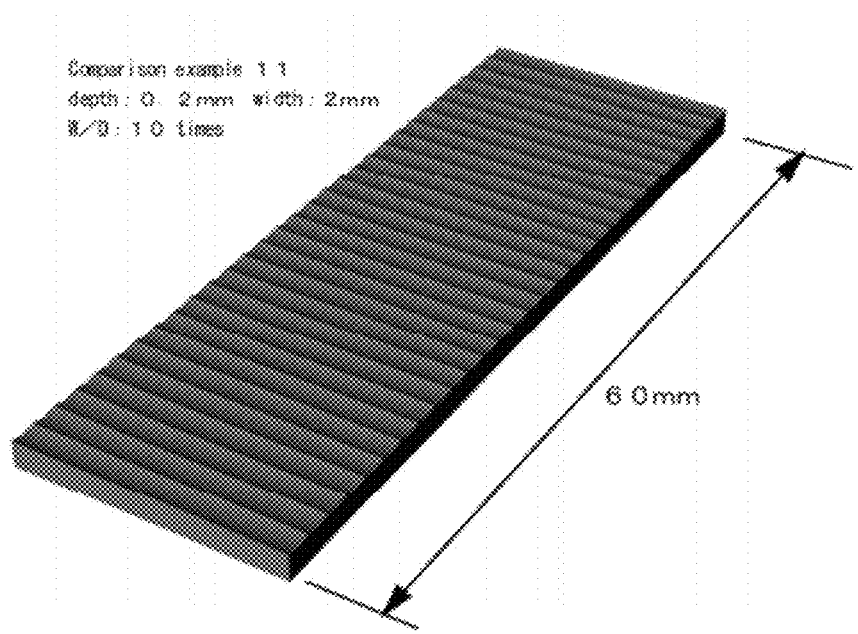
FIG. 29 shows a part of flat-plate models used for evaluation.
Figure 30:
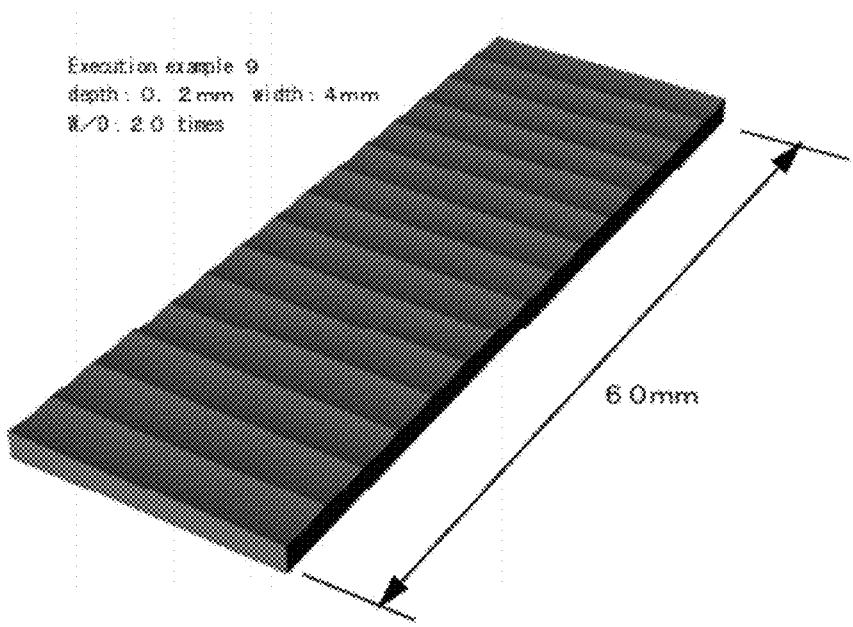
FIG. 30 shows a part of flat-plate models used for evaluation.
Figure 31:
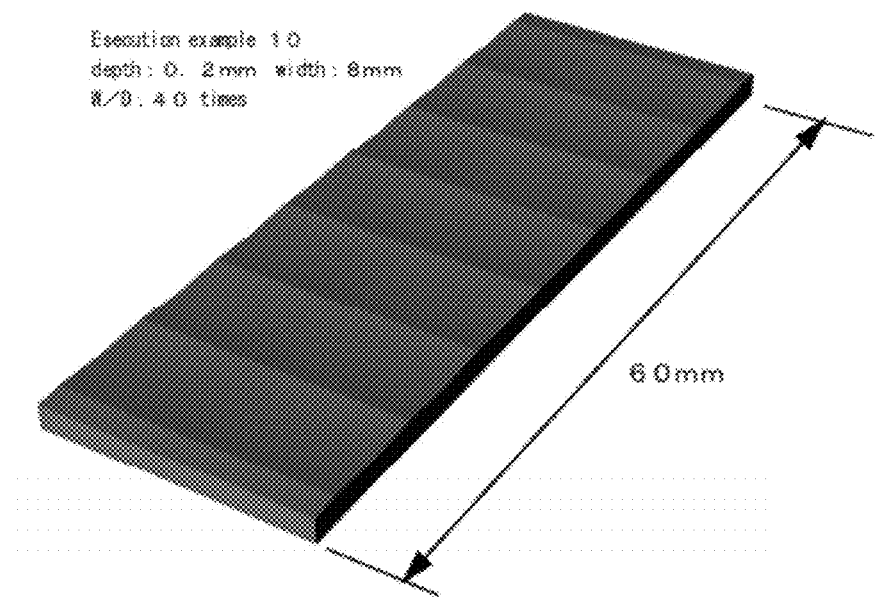
FIG. 31 shows a part of flat-plate models used for evaluation.
Figure 32:
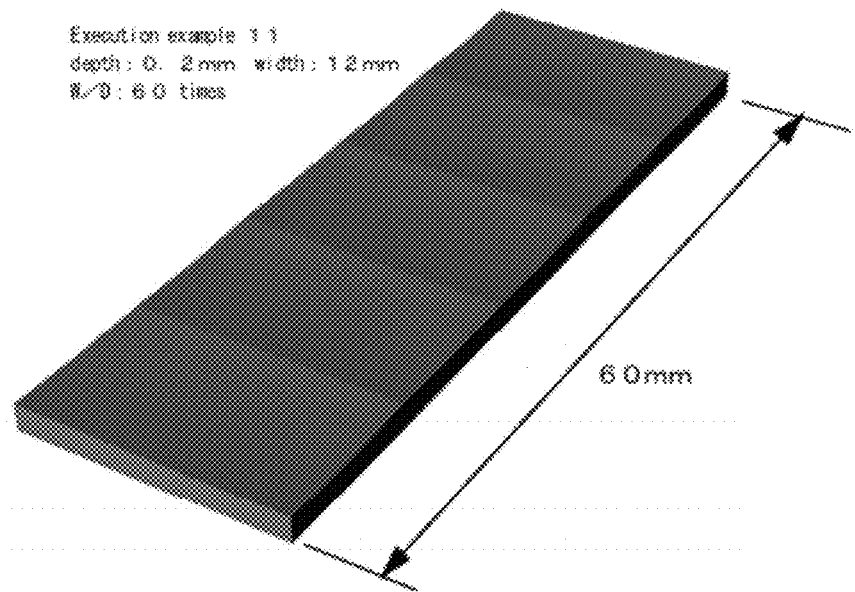
FIG. 32 shows a part of flat-plate models used for evaluation.
Figure 33:
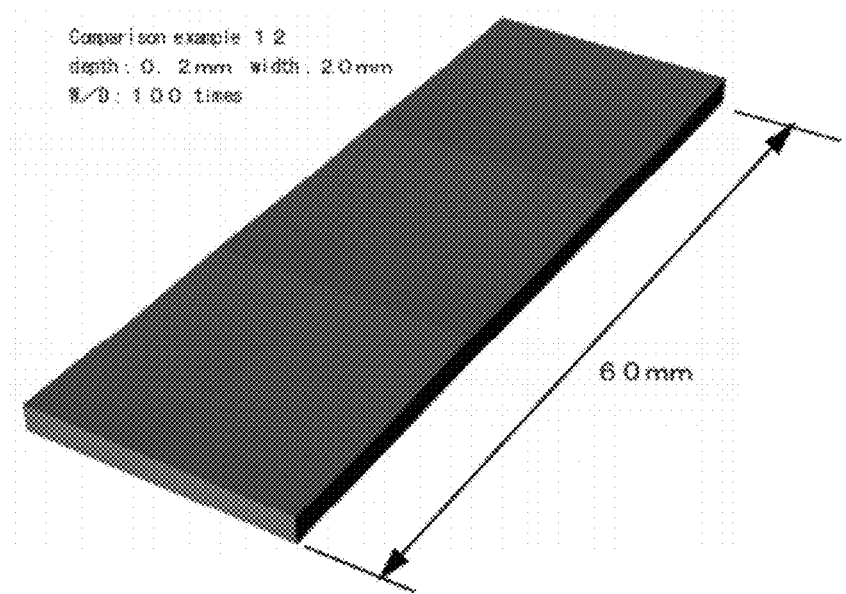
FIG. 33 shows a part of flat-plate models used for evaluation.
Figure 34:
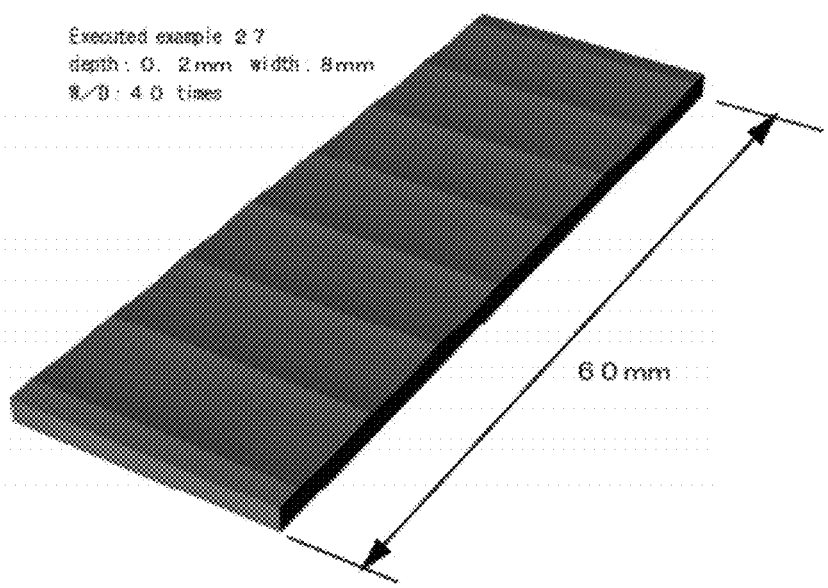
FIG. 34 shows part of flat-plate models used for evaluation.

The applicant prepared a plurality of kinds of CG (computer graphic) models with a plurality of settings of the width W and the depth D of recesses 22 so as to evaluate the visibilities of ridge lines RL and gradation, as shown in FIGS. 21 to 25. In this evaluation, the visibilities of gradation appearing on a plurality of recesses 22 and ridge lines RL appearing between the recesses 22 when the plurality of recesses 22 were provided on a surface on one side in the thickness direction of a flat-plate model such as illustrated in FIGS. 26 and 27 were evaluated. For this evaluation of the visibilities of the gradation and the ridge lines RL, light was applied in a direction which is approximately at 30° from the one surface in the thickness direction of the flat-plate model, as shown in FIG. 27. Each model was viewed from an oblique direction which is approximately at 45° from the one surface in the thickness direction and is approximately at 30° from the direction in which the recesses 22 are aligned. It is often the case that light such as sunlight is applied to the outer surface 11 of the side wall 10 in a direction at about 30° when tires are attached to a motor vehicle or stacked flat for a sale, and therefore, there are many chances that the recesses 22 are viewed from the direction approximately at 45° from the outer surface 11 and is approximately at 30° from the direction in which the recesses 22 are aligned. The evaluation was performed under the above-described conditions.

As to FIGS. 21 to 26, the evaluation was performed with respect to a case where each recess 22 was formed by a single curved surface of which a center of curvature C1 was disposed at the outside in the tire width direction (for example, in a case where the recess 22 was formed by a single circular arc, as shown in FIG. 4).

The results of evaluation of the visibilities of the ridge lines RL and the gradation on FIGS. 21 to 26 were obtained from a plurality of viewers evaluating the visibilities of the ridge lines RL and the gradation on the each model. The evaluation results from the viewers were combined and indexed. More specifically, the viewers conducted a three-level evaluation of which levels are "excellent visibility", "good visibility" and "poor visibility or invisible", and the evaluation results were combined and indexed. Also, an evaluation result when 75% or more of the total number of viewers determined that "good visibility" is scored as 100 and an evaluation result when 90% or more of the total number of viewers determined that "good visibility" is scored as 102. An evaluation result with a higher numeric value is more favorable. The applicant considers the visibility to be good when the evaluation result is 100 or higher.

As shown in FIG. 21, it is found that when the depth of the each recess 22 is smaller than 0.1 mm, the visibilities of the ridge lines RL and the gradation are considerably poor because the each recess 22 is excessively shallow. It is also found that when the depth of each recess 22 is 0.1 mm or more, the visibilities of the ridge lines RL and the gradation are good among the ratio (W/D) of the width W to the depth D as shown below.

Also, as shown in FIGS. 21 to 24, for example, comparing the evaluation results with respect to the case where the ratio (W/D) of the width W to the depth D is 40 (Examples 1, 4, 7, 10) when the depth D of the each recess 22 is among 0.1 mm and 0.2 mm, the visibilities of the ridge lines RL and the gradation are improved with increase in depth D of each recess 22. As shown in FIGS. 24 to 26, it is also found that comparing the evaluation results with respect to the case where the ratio (W/D) of the width W to the depth D is 60 (Examples 11, 16, 22) when the depth D of each recess 22 is among 0.2 mm and a higher value, improvements in the visibilities of the ridge lines RL and the gradation with the depth of each recess 22 are not conspicuous.

On the other hand, it is found that, as shown in FIGS. 21 to 26, when the width W of each recess 22 is among 2 mm and a smaller value, the each recess 22 is so excessively thin that the visibility of the gradation is poor and that the each recess 22 can look like a groove. In contrast, it is also found that when the width W of each recess 22 is among 4 mm and a larger value, the visibilities of the ridge lines RL and the gradation are good.

Also, as shown in FIGS. 21 to 26, it is found that when the ratio (W/D) of the width W to the depth D is equal to or higher than 2 and equal to or lower than 60, the visibilities of the ridge lines RL and the gradation are good. Further, as shown in FIG. 26 it is found that when the ratio (W/D) of the width W to the depth D is equal to or higher than 5, the visibility of the gradation are good, and that when the ratio (W/D) of the width W to the depth D is equal to or higher than 10, the visibility of the gradation is further improved.

That is, it is found that the visibilities of the ridge lines RL and the gradation are good when the ratio (W/D) of the width W to the depth D is equal to or higher than 2 and equal to or lower than 60, the visibility of the gradation is improved when the ratio (W/D) of the width W to the depth D is equal to or higher than 5 and equal to or lower than 60, and the visibility of the gradation is further improved when the ratio (W/D) of the width W to the depth D is equal to or higher than 10 and equal to or lower than 60. In the case where the recess is deep (the ratio W/D is low), a part of the surface of the recess is invisible due to the projection in the vicinity of the ridge line (such condition is called as "seen as a difference in level" in this specification) or a part of the surface of the recess is difficult to be seen due to the projection in the vicinity of the ridge line when the model is viewed in the direction approximately at 30° from the one surface in the thickness direction. Therefore, it is thought that among 2 and 10 of the ratio (W/D) of the width W to the depth D, the visibility of the gradation in the recess is improved with increase in W/D.

As to the FIGS. 21 to 26, the evaluations are of the recesses 22 formed by the single circular arc. Therefore the radius of curvature R of the curved surface of the each recess 22 relating to the each evaluation can be derived, as shown in FIGS. 21 to 26. By this, it is found that the visibilities of the ridge lines RL and the gradation are good when the ratio (R/D) of the radius of curvature R to the depth D is equal to or higher than 1 and equal to or lower than 451, the visibility of the gradation is improved when the ratio (R/D) of the radius of curvature R to the depth D is equal to or higher than 4 and equal to or lower than 451, and the visibility of the gradation is further improved when the ratio (R/D) of the radius of curvature R to the depth D is equal to or higher than 13 and equal to or lower than 451.

Figure 35:
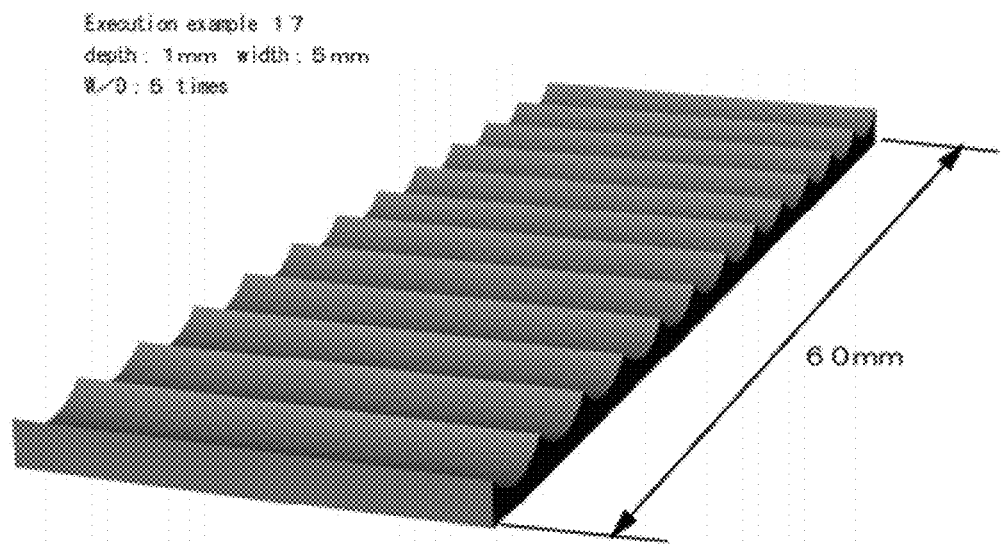
FIG. 35 shows part of flat-plate models used for evaluation.

Further, as shown in FIGS. 21 to 26, the viewers conducted evaluations as to whether or not the each recess 22 is seen as a difference in level as previously described when the each model was viewed in a direction approximately at 30° from the one surface in the thickness direction (30° direction viewing results) and when the each model is viewed in a direction approximately at 15° from the one surface in the thickness direction (15° direction viewing results). Also, as shown in FIG. 35, for example, when the surface in the recess over the ridge line RL cannot clearly be seen, it is evaluated that the surface is seen as a difference in level. As to FIG. 35, the model of Example 17 is viewed from the 30° direction. As to FIGS. 21 to 26, when 75% or more of the viewers determine that the surface is not seen as a difference in level, the evaluation result is to be "invisible".

FIGS. 29 to 33 show part of the flat-plate models used for the evaluation. As shown in FIG. 26, the visibilities of the ridge lines RL and the gradation are excellent when W/D is 10 to (R/D was 13 to 451). In particular, when W/D is equal to or higher than 15 (R/D was 29 or higher), many of the viewers felt that the one surface of the flat-plate model in the thickness direction was smooth and was almost plane comparing with the cited document 2 which provides grooves. That is, the appearance is utterly different when a plurality of grooves are provided on the surface of the each FIG. 21 of the indication portion 20 as described in cited document 2. Further, without producing large projections and depressions such as a plurality of grooves provided on the surface of each FIG. 21, the surface of each FIG. 21 looks three-dimensional due to the ridge lines RL and the gradation and the each FIG. 21 in the indication portion 20 gives a unique impression to viewers. For this reason, such as when a plurality of grooves called ridges are formed in the region 11a of the side wall 10 for example, the each FIG. 21 can become conspicuous and it is extremely advantageous in effectively improving the visibility of the first indication portion 20 provided on the side wall 10.

Figure 36:
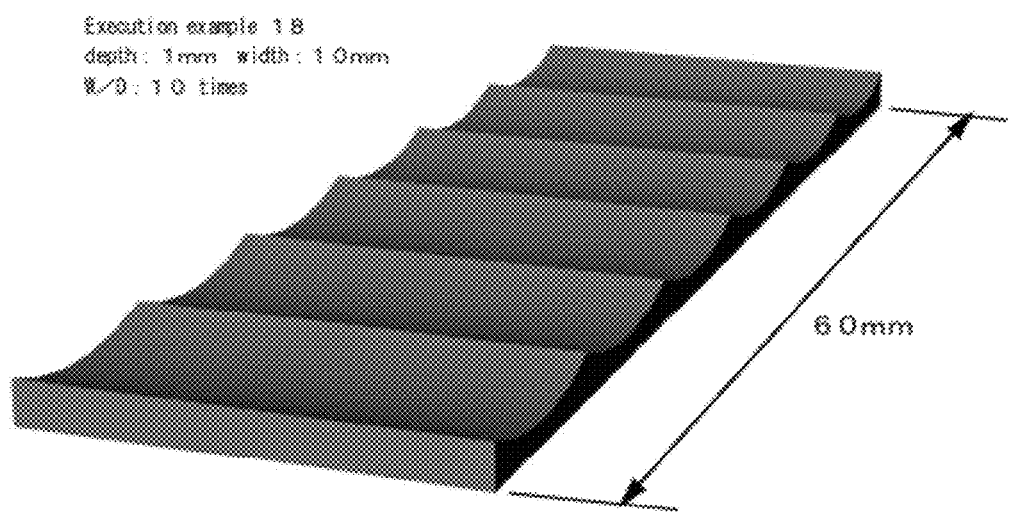
FIG. 36 shows part of flat-plate models used for evaluation.

Also, as shown in FIGS. 21 to 26, as to the 30° direction viewing results, the evaluation is "invisible" (see FIGS. 35 and 36) when W/D is 10 or higher (R/D was 13 or higher), and as to the 15° direction viewing results, the evaluation is "invisible" (see FIGS. 35 and 36) when W/D is 15 or higher (R/D was 29 or higher). That is, when W/D is equal to or higher than 10 and equal to or lower than 60 (R/D is equal to or higher than 13 and equal to or lower than 451), a unique effect of causing the surface of each FIG. 21 to be seen three-dimensionally by means of the ridge lines RL and the gradation can be achieved, without producing large projections and depressions such as a plurality of grooves provided on the surface of each FIG. 21. The unique effect becomes conspicuous when W/D is equal to or higher than 15 and equal to or lower than 60 (R/D is equal to or higher than 29 and equal to or lower than 451). There is also the advantage of improving the visibility of the gradation regardless of the viewing direction when W/D is equal to or higher than 10 and equal to or lower than 60 (R/D is equal to or higher than 13 and equal to or lower than 451) or when W/D is equal to or higher than 15 and equal to or lower than 60 (R/D is equal to or higher than 29 and equal to or lower than 451).

Referring to FIGS. 21 to 26, ranges of the width W and the depth D of each recess 22, the ratio (W/D) of the width W to the depth and the ratio (R/D) of the radius of curvature R to the depth D are derived when the each recess 22 is formed by a single circular arc. However, as shown in FIG. 7, when one end side and the other end side of each recess 22 in the width direction are formed by curved surfaces CS and another surface OS is formed of a flat surface or a curved surface of which a center of curvature is disposed at the inside in the tire width direction, ranges of the width W and the depth D of each recess 22, the ratio (W/D) of the width W to the depth D and the ratio (R/D) of the radius of curvature R to the depth D are derived as described below. The flat surface comprises a curved surface of a slight curvature, for example, a substantially flat curved surface of which a center of curvature is disposed at the outside or at the inside in the tire width direction, and which has a radius of curvature of 500 or larger. Even in such case, effects described below can be achieved.

First, as an example of the recess 22 in which one end side and the other end side in the width direction are formed by curved surfaces CS while another surface OS is formed of a flat surface or a curved surface of which a center of curvature is disposed at the inside in the tire width direction, as shown in FIG. 37, a recess 22 formed by a single circular arc is divided at an intermediate portion and another surface OS is provided between divided portions is conceivable. Thus, the visibilities of the gradation and the ridge lines RL become good if the width W, the depth D and the ratio (R/D) of the radius of curvature R to the depth D are within the ranges derived with reference to FIGS. 21 to 26.

That is, even when one end side and the other end side of each recess 22 in the width direction are formed by curved surfaces CS while another surface OS is formed of a flat surface or a curved surface of which a center of curvature is disposed at the inside in the tire width direction, if the depth of each recess 22 is 0.1 mm or more, by satisfying the conditions in terms of the width W and the ratio (R/D) of the radius of curvature R to the depth D, the visibilities of the ridge lines RL and the gradation become good.

Also, the visibilities of the ridge lines RL and the gradation are good when the width W of each recess 22 is among 4 mm and a larger value.

Also, the visibilities of the ridge lines RL and the gradation become good when the ratio (W/D) of the width W to the depth D is equal to or higher than 2, and when the ratio (R/D) of the radius of curvature R to the depth D is equal to or higher than 1 and equal to or lower than 451. In this case, the upper limit on the ratio (W/D) of the width W to the depth D as in the case where the recess 22 is formed by a single circular arc is not set up. This is because the visibilities of the ridge lines RL and the gradation depend on the ratio (R/D) of the radius of curvature R to the depth D in the case of the recess 22 in which one end side and the other end side in the width direction are formed by curved surfaces CS while the other surface OS is formed of a flat surface or a curved surface of which a center of curvature is disposed at the inside in the tire width direction, and because W/D can be adjusted depend on the length of the other surface OS.

Similarly, the visibilities of the ridge lines RL and the gradation improves when the ratio (W/D) of the width W to the depth D is equal to or higher than 5, and when the ratio (R/D) of the radius of curvature R to the depth D is equal to or higher than 4 and equal to or lower than 451. Further, the visibilities of the ridge lines RL and the gradation are improved when the ratio (W/D) of the width W to the depth D is equal to or higher than 10, and when the ratio (R/D) of the radius of curvature R to the depth D is equal to or higher than 13 and equal to or lower than 451.

When R/D is 13 or higher, the evaluation of the 30° direction viewing results is "cannot be seen as a difference in level". When R/D is 29 or higher, the evaluation of the 15° direction viewing results is "cannot be seen as a difference in level".

FIG. 38 shows the above evaluation results. In FIG. 38, the above-described results are apparent from a comparison between Example 9 and Example 24, a comparison between Example 10 and Example 25 and a comparison between Example 11 and Example 26.

Figure 39:
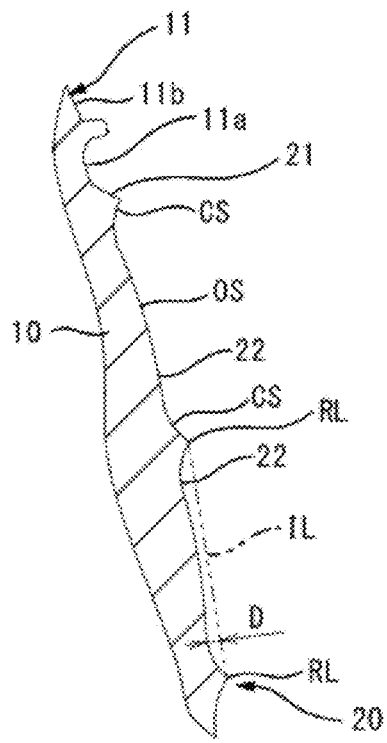
FIG. 39 is a sectional view of an essential portion of a pneumatic tire showing a tenth modification of the first embodiment.
Figure 40:
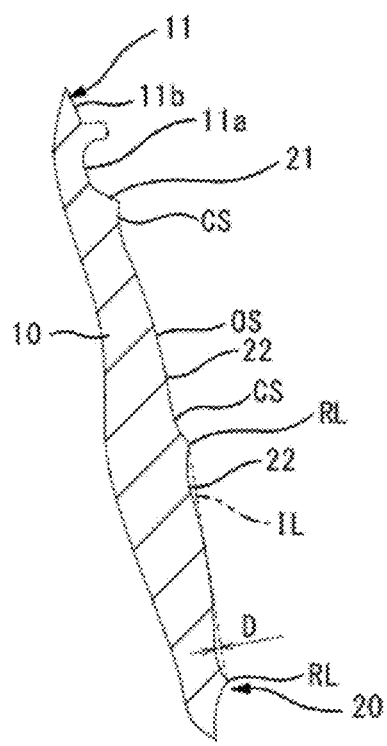
FIG. 40 is a sectional view of an essential portion of a pneumatic tire showing an eleventh modification of the first embodiment.

The above-described depth D is the maximum depth with respect to an imaginary straight line IL connecting the two ends of the recess 22 in the width direction, as shown in FIGS. 4 and 7 for example. Thus, as shown in FIGS. 39 and 40, the maximum depth with respect to the imaginary straight line IL connecting the two ends of the recess 22 in the width direction is the depth D even when the surface of the FIG. 21 is formed into a curved surface along a profile of the side wall while another surface OS is formed by a curved surface of which a center of curvature is disposed at the inside in the tire width direction (for example, a curved surface parallel to the profile of the side wall).

It is preferable to set the region (area) where the other surface of the recess 22 is provided to be 75% or less, more preferably 50% or less, further preferably 30% or less of the area of the recess 22 in order that the ridge lines RL and the gradation can be conspicuous on the surface of the FIG. 21.

Thus, when the recess 22 in which one end side and the other end side in the width direction are formed by curved surfaces CS and the other surface OS is formed of a flat surface or a curved surface of which a center of curvature is disposed at the inside in the tire width direction, it is advantageous in increasing the range of adjustment of the ratio (W/D) of the width W to the depth D comparing to the case where the recess 22 is formed by a single circular arc.

Further, when the recess 22 in which one end side and the other end side in the width direction are formed by curved surfaces CS and the other surface OS is formed of a flat surface, it is advantageous in facilitating forming the vulcanization mold comparing to the case where the recess 22 is formed by the single circular arc.

While the evaluations shown in FIGS. 21 to 26 with respect to the arrangement in which the radius of curvature R is constant, the same functions and effects as those described above can be achieved when the ratio (R/D) of the radius of curvature R to the depth D is within the above-described range, particularly when the ratio (R/D) of the radius of curvature R to the depth D in the vicinity of the ridge lines RL is within the above-described range even when the recess 22 is formed so that the radius of curvature R of its curved surface is gradually changes.

Figure 41:
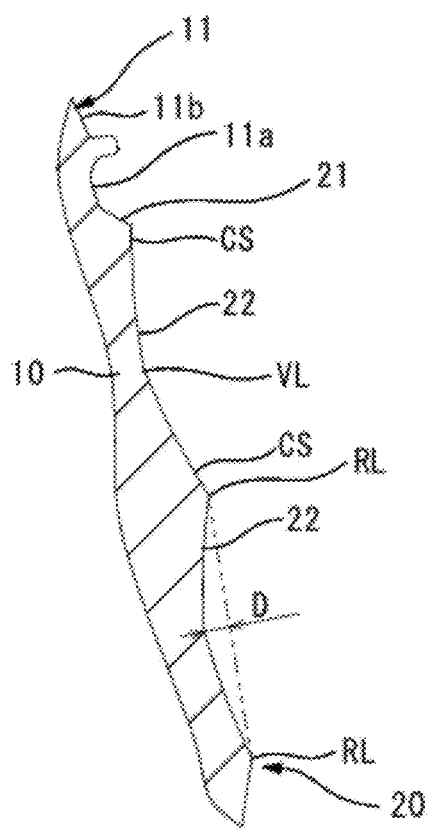
FIG. 41 is a sectional view of an essential portion of a pneumatic tire showing a twelfth modification of the first embodiment.

As shown in FIG. 41, even when one end side and the other end side in the width direction of each recess 22 are formed by curved surfaces CS and a valley line VL is formed between the curved surfaces CS of the one end and other end sides in the width direction without providing another surface between the curved surfaces CS of the one end and other end sides in the width direction, the same functions and effects as those described above can be achieved if the width W and the depth D of each recess 22, the ratio (W/D) of the width W to the depth D and the ratio (R/D) of the radius of curvature R to the depth D are within the above-described ranges.

Figure 42:
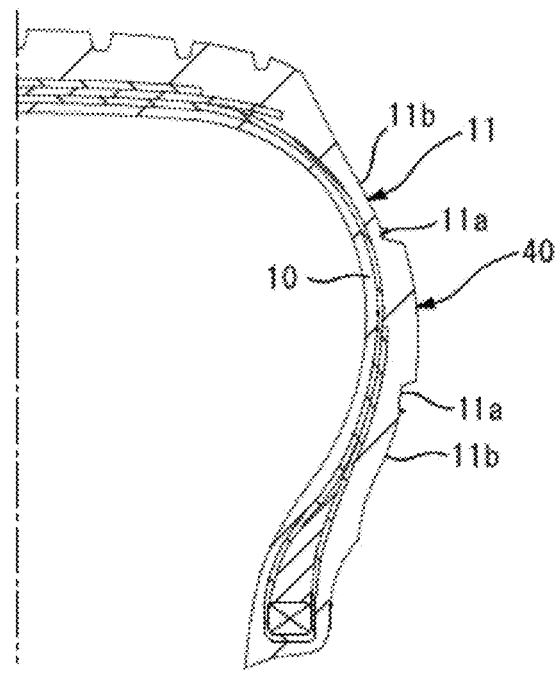
FIG. 42 is a sectional view of an essential portion of a pneumatic tire showing a thirteenth modification of the first embodiment.
Figure 43:
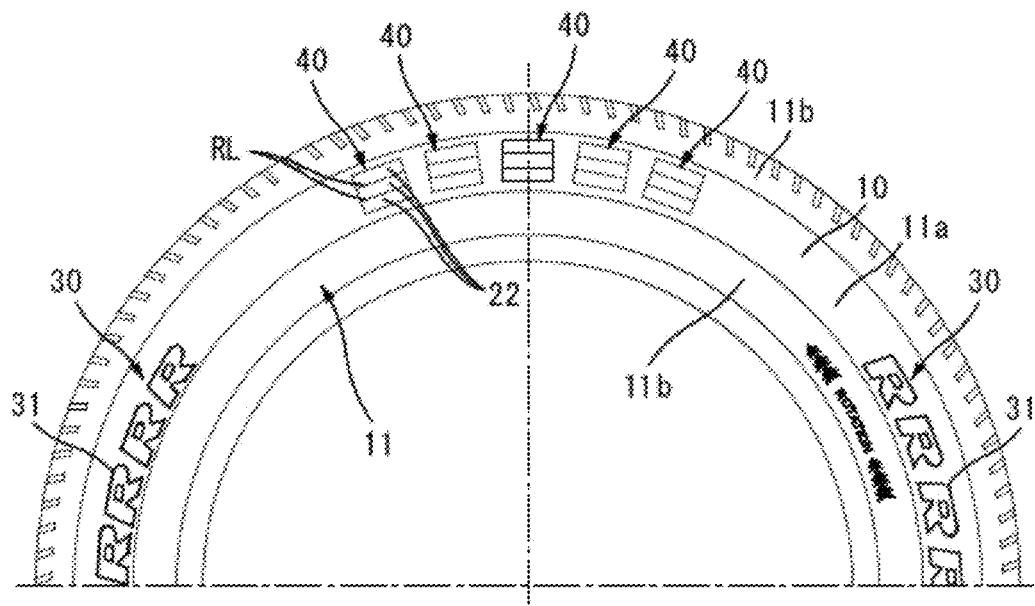
FIG. 43 is a side view of the pneumatic tire showing the thirteenth modification of the first embodiment.

In the above-described embodiments, an arrangement in which a plurality of FIG. 21 and a plurality of letters 31 are provided on the outer surface 11 of the side wall 10 and in which a plurality of recesses are provided in each of the FIG. 21 and the letters 31 has been illustrated. Needless to say, an arrangement is also possible in which, as shown in FIGS. 42 and 43, a projection portion 40 called a side protector is provided on the outer surface 11 of the side wall 10, and a plurality of recesses 22 are provided on the surface of the projection portion 40. Also in such case, the same functions and effects as those described above can be achieved. As shown in FIG. 43, for example, the projection portion 40 are formed in a rectangular form and a plurality of the projection portions 40 are provided so as to be aligned side by side in the tire circumferential direction. The projection portions 40 are provided to prevent the outer surface 11 of the side wall 10 from being scratched by rubbing with a border stone or the like. The recesses 22 can be provided on any projection objects other than the side protector.

In this specification, the region between an end portion of a tire tread pattern and a bead portion is referred to as side wall 10.

The preferred modes described in this specification are not limitative but illustrative of the invention. The scope of the invention is shown in the appended claims. The present invention encompasses all modifications falling within the meanings of the claims.

The invention claimed is:

1. A pneumatic tire provided with an indication portion formed by molding a visually defined area comprising a plurality of letters or figures aligned in a sequence on an outer surface of a side wall of the pneumatic tire, the pneumatic tire comprising
at least three interconnected recesses provided on the surface of each of said plurality of letters or figures of said indication portion, the recesses each extending in a predetermined extending direction and aligned side by side with each other in an alignment direction crossing the extending direction, wherein:
the interconnected recesses all have similar cross-sectional configurations and dimensions to generate a repeating visual pattern on the indication portion,
one end side and the other end side of each recess in its width direction are each respectively formed by a curved surface portion of which a center of curvature is disposed outside of the tire, such that a gradation of brightness of reflected light occurs on the curved surface portion of the recess and the gradation of brightness of each recess varies according to a viewing direction or a light direction;
a ridge line is formed at a raised portion where curved surfaces of two mutually adjacent recesses intersect, wherein brightness of the surface of the raised portion varies across the ridge line,
each recess has the depth of 0.1 mm or more and the width of 4 mm or more, and the width of each recess is five times larger or more of the depth,
each of the curved surface portions of each recess is formed in an arcuate shape as viewed in cross section, with a depth of the curved surface portion varying in a radial direction of the tire, and
radii of curvature of the curved surfaces of the one end side in the width direction and the other end side in the width direction of said each recess are 13 times larger or more than the depth of the recess in which the curved surfaces are provided.

2. The pneumatic tire according to claim 1, wherein
said indication portion comprises a plurality of figures which are arranged at intervals with each other in a tire circumferential direction on the outer surface of the side wall and each formed in a parallelogram shape, and
said recesses are provided on the surface of each of the figures.

3. The pneumatic tire according to claim 2, wherein the respective figures of said indication portion are disposed so as to be aligned in the tire circumferential direction, and the recesses provided on two mutually adjacent figures are aligned in the tire circumferential direction.

4. The pneumatic tire according to claim 3, wherein said indication portion is composed of two or more letters or figures disposed so as to be aligned side by side in the tire circumferential direction.

5. The pneumatic tire according to claim 1, wherein radii of curvature of the curved surfaces of the one end side in the width direction and the other end side in the width direction of said each recess are 29 times larger or more of the depth of the recess in which the curved surfaces are provided.

6. The pneumatic tire according to claim 1, wherein said indication portion comprises a plurality of letters or a plurality of figures disposed so as to be aligned in a tire circumferential direction, a plurality of recesses is provided on each letter or each figure respectively, and the respective recesses of two mutually adjacent letters or figures are aligned in the tire circumferential direction.

7. A pneumatic tire provided with an indication portion formed by molding a visually defined area comprising a plurality of letters or figures aligned in a sequence on an outer surface of a side wall of the pneumatic tire, the pneumatic tire comprising
at least three interconnected recesses provided on the surface of each of said plurality of letters or figures of said indication portion, the recesses each extending in a predetermined extending direction and aligned side by side with each other in an alignment direction crossing the extending direction, wherein:
the interconnected recesses all have similar cross-sectional configurations and dimensions to generate a repeating visual pattern on the indication portion,
each recess comprises a curved surface portion of which a center of curvature is disposed outside of the tire, wherein a gradation of brightness of reflected light occurs on the curved surface portion of the recess,
a ridge line is formed at a raised portion where curved surfaces of two mutually adjacent recesses intersect, the ridge line forming a peak as viewed in cross section,
the curved surface portion of each recess is formed in an arcuate shape as viewed in cross section, and
each recess has the depth of 0.1 mm or more and the width of 4 mm or more, and the width of each recess is five times larger or more of the depth.

8. The pneumatic tire according to claim 7, wherein
said indication portion comprises a plurality of figures which are arranged at intervals with each other in a tire circumferential direction on the outer surface of the side wall and each formed in a parallelogram shape, and
said recesses are provided on the surface of each of the figures.

9. The pneumatic tire according to claim 8, wherein the respective figures of said indication portion are disposed so as to be aligned in the tire circumferential direction, and the recesses provided on two mutually adjacent figures are aligned in the tire circumferential direction.

10. The pneumatic tire according to claim 9, wherein said indication portion is composed of two or more figures disposed so as to be aligned side by side in the tire circumferential direction.

11. The pneumatic tire according to claim 7, wherein the width of said each recess is 10 times larger or more of the depth.

12. The pneumatic tire according to claim 7, wherein the width of said each recess is 15 times larger or more of the depth.

13. The pneumatic tire according to claim 7, wherein said indication portion comprises a plurality of letters or a plurality of figures disposed so as to be aligned in a tire circumferential direction, a plurality of said recesses is provided on each letter or each figure, respectively, and the respective recesses of two mutually adjacent letters or figures are aligned in the tire circumferential direction.

14. The pneumatic tire according to claim 13, wherein said indication portion is composed of two or more letters or figures disposed so as to be aligned side by side in the tire circumferential direction.

15. The pneumatic tire according to claim 14, wherein two or more of said projection portions are disposed so as to be aligned side by side in the tire circumferential direction.

16. A pneumatic tire provided with at least one indication portion comprising a plurality of projection portions aligned in a sequence and formed by a vulcanization mold on an outer surface of a side wall of the pneumatic tire, the projection portions projecting outwardly beyond adjacent portions of the side wall outer surface, the pneumatic tire comprising at least three interconnected recesses provided on the surface of each of the projection portions, the recesses each extending in a predetermined extending direction and aligned side by side with each other in an alignment direction crossing the extending direction, wherein:

the interconnected recesses all have similar cross-sectional configurations and dimensions to generate a repeating visual pattern on the indication portion, one end side and the other end side of each recess in its width direction are each respectively formed by a curved surface portion of which a center of curvature is disposed outside of the tire, such that a gradation of brightness of reflected light occurs on the curved surface portion of the recess and the gradation of brightness of each recess varies according to a viewing direction or a light direction, each of the curved surface portions of each recess is formed in an arcuate shape as viewed in cross section, a ridge line is formed at a raised portion where curved surfaces of two mutually adjacent recesses intersect, the ridge line forming a peak as viewed in cross section, wherein brightness of the surface of the raised portion varies across the ridge line, each recess has the depth of 0.1 mm or more and the width of 4 mm or more, and the width of each recess is five times larger or more of the depth, and radii of curvature of the curved surfaces of the one end side in the width direction and the other end side in the width direction of said each recess are 13 times larger or more than the depth of the recess in which the curved surfaces are provided.

17. The pneumatic tire according to claim 16, wherein said at least one projection portion comprises a plurality of projection portions disposed so as to be aligned in a tire circumferential direction, wherein said plurality of recesses are provided on the respective projection portions, and wherein the respective recesses provided on two mutually adjacent projection portions are aligned in the tire circumferential direction respectively.

18. The pneumatic tire according to claim 17, wherein said indication portion is composed of two or more figures disposed so as to be aligned side by side in the tire circumferential direction.

19. The pneumatic tire according to claim 16, wherein the width of said each recess is 10 times larger or more of the depth.

20. The pneumatic tire according to claim 16, wherein the width of said each recess is 15 times larger or more of the depth.

21. The pneumatic tire according to claim 16, wherein radii of curvature of the curved surfaces of the one end side in the width direction and the other end side in the width direction of said each recess are 29 times larger or more of the depth of the recess in which the curved surfaces are provided.

22. A pneumatic tire provided with at least one indication portion comprising a plurality of projection portions aligned in a sequence and formed by a vulcanization mold on an outer surface of a side wall of the pneumatic tire, the projection portions projecting outwardly beyond adjacent portions of the side wall outer surface, the pneumatic tire comprising at least three interconnected recesses provided on the surface of each of the projection portions, the recesses each extending in a predetermined extending direction and aligned side by side with each other in an alignment direction crossing the extending direction, wherein:

the interconnected recesses all have similar cross-sectional configurations and dimensions to generate a repeating visual pattern on the indication portion, each recess comprises a curved surface portion of which a center of curvature is disposed outside of the tire, wherein a gradation of brightness of reflected light occurs on the curved surface portion of the recess and the gradation of brightness for each recess changes depending on a viewing direction or a light direction;

each of the curved surface portions of each recess is formed in an arcuate shape as viewed in cross section, a ridge line is formed at a portion where the curved surfaces of two mutually adjacent recesses intersect, the ridge line forming a peak as viewed in cross section, wherein brightness of the surface of the raised portion varies across the ridge line, and each recess has the depth of 0.1 mm or more and the width of 4 mm or more, and the width of each recess is five times larger or more of the depth.

23. The pneumatic tire according to claim 22, wherein said at least one projection portion comprises a plurality of projection portions disposed so as to be aligned in a tire circumferential direction, wherein said plurality of recesses are provided on the respective projection portions, and wherein the respective recesses provided on two mutually adjacent projection portions are aligned in the tire circumferential direction respectively.

24. The pneumatic tire according to claim 23, wherein two or more of said projection portions are disposed so as to be aligned side by side in the tire circumferential direction.

25. The pneumatic tire according to claim 22, wherein the width of said each recess is 10 times larger or more of the depth.

26. The pneumatic tire according to claim 22, wherein the width of said each recess is 15 times larger or more of the depth.

* * * * *